United States Patent
Spottiswoode et al.

(10) Patent No.: US 9,025,757 B2
(45) Date of Patent: May 5, 2015

(54) CALL MAPPING SYSTEMS AND METHODS USING BAYESIAN MEAN REGRESSION (BMR)

(71) Applicant: The Resource Group International, Ltd., Hamilton (BM)

(72) Inventors: S. James P. Spottiswoode, Beverly Hills, CA (US); Zia Chishti, Washington, DC (US)

(73) Assignee: Satmap International Holdings Limited, Hamilton (BM)

( * ) Notice: Subject to any disclaimer, the term of this patent is extended or adjusted under 35 U.S.C. 154(b) by 196 days.

(21) Appl. No.: 13/843,807

(22) Filed: Mar. 15, 2013

(65) Prior Publication Data
US 2013/0251138 A1 Sep. 26, 2013

Related U.S. Application Data

(60) Provisional application No. 61/615,779, filed on Mar. 26, 2012, provisional application No. 61/615,788, filed on Mar. 26, 2012, provisional application No. 61/615,772, filed on Mar. 26, 2012.

(51) Int. Cl.
*H04M 3/00* (2006.01)
*H04M 5/00* (2006.01)
(Continued)

(52) U.S. Cl.
CPC .......... *H04M 3/5233* (2013.01); *H04M 3/5232* (2013.01); *G06Q 30/00* (2013.01)

(58) Field of Classification Search
CPC .................... H04M 3/5233; H04M 2203/401; G06Q 10/06398; G06Q 10/0639
USPC ........................................ 379/265.06, 265.12
See application file for complete search history.

(56) References Cited

U.S. PATENT DOCUMENTS

| 5,155,763 | A | 10/1992 | Bigus et al. |
| 5,206,903 | A | 4/1993 | Kohler et al. |

(Continued)

FOREIGN PATENT DOCUMENTS

| EP | 0 493 292 A2 | 7/1992 |
| EP | 0 949 793 A1 | 10/1999 |

(Continued)

OTHER PUBLICATIONS

U.S. Appl. No. 12/266,446, filed Nov. 6, 2008, Chishti.

(Continued)

*Primary Examiner* — Nafiz E Hoque
(74) *Attorney, Agent, or Firm* — Wilmer Cutler Pickering Hale and Dorr LLP

(57) ABSTRACT

A method, system and program product, the method comprising: determining a distribution of real agent performance from previous real agent performance data; determining a set of hypothetical agents with respective hypothetical agent performances $AP_i$ ranging from a worst performance to a best performance; calculating for each of the set of hypothetical agents a posterior distribution taking into account actual results of a respective actual agent in multiple skills, using the distribution of real agent performance and the set of hypothetical agents with respective hypothetical agent performances $AP_i$, to obtain a total probability for each hypothetical agent of the set of the hypothetical agents; repeating calculating the posterior distribution steps for multiple of the hypothetical agents to obtain the respective total probabilities for the respective hypothetical agents; determining one hypothetical agent with a better value of total probability as the actual agent's most probable global performance. This method may also be applied to obtain caller global propensity.

24 Claims, 12 Drawing Sheets

(51) Int. Cl.
*H04M 3/523* (2006.01)
*G06Q 30/00* (2012.01)

(56) References Cited

U.S. PATENT DOCUMENTS

| | | |
|---|---|---|
| 5,702,253 A | 12/1997 | Bryce et al. |
| 5,825,869 A | 10/1998 | Brooks et al. |
| 5,903,641 A | 5/1999 | Tonisson |
| 5,926,538 A | 7/1999 | Deryugin et al. |
| 6,052,460 A | 4/2000 | Fisher et al. |
| 6,064,731 A | 5/2000 | Flockhart et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 * | 7/2005 | Peterson et al. ......... 379/265.06 |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,092,509 B1 | 8/2006 | Mears et al. |
| 7,103,172 B2 | 9/2006 | Brown et al. |
| 7,158,628 B2 | 1/2007 | McConnell et al. |
| 7,209,549 B2 | 4/2007 | Reynolds et al. |
| 7,231,032 B2 | 6/2007 | Nevman et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 2001/0032120 A1 * | 10/2001 | Stuart et al. ...................... 705/11 |
| 2002/0018554 A1 | 2/2002 | Jensen et al. |
| 2002/0046030 A1 | 4/2002 | Haritsa et al. |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 * | 1/2005 | Walters, Jr. ............ 379/266.08 |
| 2005/0043986 A1 | 2/2005 | McConnell et al. |
| 2005/0129212 A1 | 6/2005 | Parker |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts et al. |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0154007 A1 | 7/2007 | Bernhard |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054452 A1 | 3/2010 | Afzal |
| 2010/0054453 A1 | 3/2010 | Stewart |
| 2010/0111287 A1 | 5/2010 | Xie et al. |
| 2010/0111288 A1 | 5/2010 | Afzal et al. |

(56) References Cited

U.S. PATENT DOCUMENTS

| | | | |
|---|---|---|---|
| 2010/0183138 | A1 | 7/2010 | Spottiswoode et al. |
| 2011/0022357 | A1 | 1/2011 | Vock et al. |
| 2011/0031112 | A1 | 2/2011 | Birang et al. |
| 2011/0069821 | A1 | 3/2011 | Korolev et al. |
| 2011/0125048 | A1 | 5/2011 | Causevic et al. |
| 2012/0051536 | A1 | 3/2012 | Chishti et al. |
| 2012/0278136 | A1 | 11/2012 | Flockhart et al. |
| 2013/0003959 | A1 | 1/2013 | Nishikawa et al. |

FOREIGN PATENT DOCUMENTS

| | | |
|---|---|---|
| EP | 1 032 188 A1 | 8/2000 |
| JP | 11-098252 | 4/1999 |
| JP | 2000-078292 | 3/2000 |
| JP | 2000-092213 | 3/2000 |
| JP | 2000-236393 | 8/2000 |
| JP | 2001-292236 | 10/2001 |
| JP | 2001-518753 | 10/2001 |
| JP | 2002-297900 | 10/2002 |
| JP | 3366565 | 1/2003 |
| JP | 2003-187061 | 7/2003 |
| JP | 2004-227228 | 8/2004 |
| JP | 2007-324708 | 12/2007 |
| WO | WO-99/17517 | 4/1999 |
| WO | WO-01/63894 | 8/2001 |
| WO | WO-2006/124113 A2 | 11/2006 |
| WO | WO-2010/053701 A2 | 5/2010 |
| WO | WO-2011/081514 | 7/2011 |

OTHER PUBLICATIONS

U.S. Appl. No. 12/266,461, filed Nov. 6, 2008, Chishti.
U.S. Appl. No. 12/331,153, filed Dec. 9, 2008, Spottiswoode et al.
U.S. Appl. No. 12/869,654, filed Aug. 26, 2010, Chishti et al.
U.S. Appl. No. 13/221,692, filed Aug. 30, 2011, Spottiswoode et al.
U.S. Appl. No. 13/715,765, filed Dec. 14, 2012, Zia Chishti et al.
U.S. Appl. No. 13/843,541, filed Mar. 15, 2013, Zia Chishti et al.
U.S. Appl. No. 13/843,724, filed Mar. 15, 2013, Spottiswoode et al.
U.S. Appl. No. 13/854,825, filed Mar. 15, 2013, Zia Chishti et al.
Anonymous. (2006). "Performance Based Routing in Profit Call Centers," The Decision Makers' Direct, located at www.decisioncraft.com, Issue 12/06/1, three pages.
Gans, N. et al. (2003). "Telephone Call Centers: Tutorial, Review and Research Prospects," Manuscript, pp. 1-81.
International Search Report mailed Jul. 6, 2010 issued in connection with PCT/US2009/061537.
International Search Report mailed on Feb. 24, 2010, for PCT Application No. PCT/US2009/066254, filed on Dec. 1, 2009.
International Search Report mailed on Jun. 3, 2009, for PCT Application No. PCT/US2009/031611, filed on Jan. 21, 2009.
International Search Report mailed on Mar. 12, 2010, for PCT Application No. PCT/US2009/054352, filed on Aug. 19, 2009.
International Search Report mailed on Mar. 13, 2009, for PCT Application No. PCT/US2008/077042, filed on Sep. 19, 2008.
Koole, G. (2004). "Performance Analysis and Optimization in Customer Contact Centers," Proceedings of the Quantitative Evaluation of Systems, First International Conference, Sep. 27-30, 2004.
Koole, G. et al. (Mar. 6, 2006). "An Overview of Routing and Staffing Algorithms in Multi-Skill Customer Contact Centers," Manuscript.
Notice of Allowance dated Jun. 29, 2012 issued in connection with U.S. Appl. No. 12/355,618.
Notice of Allowance dated Sep. 19, 2012 issued in connection with U.S. Appl. No. 12/180,382.
Notice of Allowance dated Feb. 28, 2013 issued in connection with U.S. Appl. No. 12/331,201.
Office Action dated Jan. 19, 2012 issued in connection with U.S. Appl. No. 12/266,415.
Office Action dated Jan. 23, 2012 issued in connection with U.S. Appl. No. 12/331,186.
Office Action dated Feb. 3, 2012 issued in connection with U.S. Appl. No. 12/202,091.
Office Action dated Feb. 3, 2012 issued in connection with U.S. Appl. No. 12/202,097.
Office Action dated Mar. 1, 2012 issued in connection with U.S. Appl. No. 12/180,382.
Office Action dated Mar. 2, 2012 issued in connection with U.S. Appl. No. 12/267,459.
Office Action dated Mar. 15, 2012 issued in connection with U.S. Appl. No. 12/202,101.
Office Action dated Mar. 19, 2012 issued in connection with U.S. Appl. No. 12/490,949.
Office Action dated Mar. 30, 2012 issued in connection with U.S. Appl. No. 12/267,471.
Office Action dated Apr. 6, 2012 issued in connection with U.S. Appl. No. 12/021,251.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated May 11, 2012 issued in connection with U.S. Appl. No. 12/266,415.
Office Action dated May 11, 2012 issued in connection with U.S. Appl. No. 12/331,195.
Office Action dated Jun. 7, 2012 issued in connection with U.S. Appl. No. 12/331,181.
Office Action dated Jun. 7, 2012 issued in connection with U.S. Appl. No. 12/355,602.
Office Action dated Jun. 8, 2012 issued in connection with U.S. Appl. No. 12/266,446.
Office Action dated Jun. 18, 2012 issued in connection with U.S. Appl. No. 12/331,201.
Office Action dated Jun. 29, 2012 issued in connection with U.S. Appl. No. 12/331,153.
Office Action dated Aug. 4, 2011 issued in connection with U.S. Appl. No. 12/267,459.
Office Action dated Aug. 9, 2011 issued in connection with U.S. Appl. No. 12/202,101.
Office Action dated Aug. 19, 2011 issued in connection with U.S. Appl. No. 12/202,097.
Office Action dated Aug. 19, 2011 issued in connection with U.S. Appl. No. 12/331,186.
Office Action dated Aug. 23, 2011 issued in connection with U.S. Appl. No. 12/180,382.
Office Action dated Sep. 6, 2011 issued in connection with U.S. Appl. No. 12/202,091.
Office Action dated Sep. 12, 2011 issued in connection with U.S. Appl. No. 12/266,446.
Office Action dated Sep. 13, 2011 issued in connection with U.S. Appl. No. 12/331,181.
Office Action dated Sep. 15, 2011 issued in connection with U.S. Appl. No. 12/266,418.
Office Action dated Sep. 19, 2011 issued in connection with U.S. Appl. No. 12/021,251.
Office Action dated Sep. 23, 2011 issued in connection with U.S. Appl. No. 12/355,602.
Office Action dated Sep. 26, 2011 issued in connection with U.S. Appl. No. 12/331,153.
Office Action dated Sep. 26, 2011 issued in connection with U.S. Appl. No. 12/355,618.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Jan. 30, 2013 issued in connection with Chinese Application No. 20098011060.8, with English translation.
Office Action dated Oct. 7, 2011 issued in connection with U.S. Appl. No. 12/331,195.
Office Action dated Oct. 7, 2011 issued in connection with U.S. Appl. No. 12/331,210.
Office Action dated Oct. 9, 2012 issued in connection with U.S. Appl. No. 12/202,101.
Office Action dated Oct. 11, 2012 issued in connection with U.S. Appl. No. 12/267,459.

(56) References Cited

OTHER PUBLICATIONS

Office Action dated Oct. 29, 2012 issued in connection with U.S. Appl. No. 12/490,949.
Office Action dated Nov. 1, 2012 issued in connection with Chinese Application No. 20088012833.6, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Dec. 13, 2012 issued in connection with U.S. Appl. No. 12/355,602.
Office Action dated Feb. 21, 2013 issued in connection with Japanese Patent Application No. 2010544292.
Office Action dated Jan. 8, 2013 issued in connection with Australian Patent Application No. 2008349500.
Office Action dated Jan. 8, 2013 issued in connection with Australian Patent Application No. 2009209317.
Riedmiller, M. et al. (1993). "A Direct Adaptive Method for Faster BackpropagationLearning: The RPROP Algorithm," 1993 IEEE International Conference on Neural Networks, San Francisco, CA, Mar. 28-Apr. 1, 1993, 1:586-591.
Written Opinion mailed Jun. 10, 2010 issued in connection with PCT/US2009/061537.
Written Opinion mailed on Feb. 24, 2010, for PCT Application No. PCT/US2009/066254, filed on Dec. 1, 2009.
Written Opinion mailed on Jun. 3, 2009, for PCT Application No. PCT/US2009/031611, filed on Jan. 21, 2009.
Written Opinion mailed on Mar. 12, 2010, for PCT Application No. PCT/US2009/054352, filed on Aug. 19, 2009.
Written Opinion mailed on Mar. 13, 2009, for PCT Application No. PCT/US2008/077042, filed on Sep. 19, 2008.
International Search Report dated Jun. 14, 2013 issued in connection with PCT/US2013/033261.
International Search Report dated May 31, 2013 issued in connection with International Application No. PCT/US 13/33268.
Notice of Allowance dated Apr. 11, 2013 issued in connection with U.S. Appl. No. 12/869,654.
Notice of Allowance dated Apr. 10, 2013 issued in connection with U.S. Appl. No. 12/266,461.
NTZOUFRAS, "Bayesian Modeling Using Winbugs". Wiley Interscience, Oct. 18, 2007.
Office Action dated Jan. 31, 2013 issued in connection with U.S. Appl. No. 12/331,161.
Office Action dated Dec. 28, 2012 issued in connection with U.S. Appl. No. 12/266,461.
Office Action dated Dec. 31, 2012 issued in connection with U.S. Appl. No. 12/869,645.
Office Action dated Dec. 31, 2012 issued in connection with U.S. Appl. No. 12/869,654.
Office Action dated Mar. 28, 2013 issued in connection with U.S. Appl. No. 13/221,692.
Office Action dated Jun. 27, 2013 issued in connection with U.S. Appl. No. 12/869,645.
Office Action dated Aug. 31, 2012 issued in connection with Mexican Patent Application No. MX/a/2011/004815.
Office Action dated Jun. 7, 2013 issued in connection with Japanese Patent Application No. 2010-544399.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. MX/a/2011/004815.
Written Opinion dated Jun. 14, 2013 issued in connection with PCT/US2013/033261.
Written Opinion dated May 31, 2013 issued in connection with International Application No. PCT/US13/33268.
Mexican Office Action mailed Dec. 17, 2013 issued in connection with Application No. MX/a/2010/008238.
Notice of Allowance mailed Nov. 18, 2013 issued in connection with U.S. Appl. No. 13/854,825.
Notice of Allowance mailed Dec. 23, 2013 issued in connection with U.S. Appl. No. 12/869,654.
Notice of Allowance mailed Dec. 26, 2013 issued in connection with U.S. Appl. No. 12/869,645.
Notice of Allowance mailed Jul. 8, 2013, issued in connection with U.S. Appl. No. 13/843,541.
Notice of Allowance mailed Nov. 26, 2013 issued in connection with U.S. Appl. No. 12/331,181.
Notice of Reasons for Rejection mailed Dec. 20, 2013 issued in connection with Japanese Application No. 2010-544399 with English translation.
Office Action dated Nov. 5, 2013 issued in connection with U.S. Appl. No. 13/715,765.
Office Action dated Dec. 17, 2013 issued in connection with U.S. Appl. No. 12/331,195.
Office Action dated Nov. 6, 2013 issued in connection with U.S. Appl. No. 13/221,692.
Office Action mailed Nov. 5, 2013 issued in connection with U.S. Appl. No. 12/267,471.
Office Action mailed Dec. 10, 2013 issued in connection with U.S. Appl. No. 14/032,657.
Office Action mailed Oct. 22, 2013 issued in connection with Japanese Application No. 2011-525099.
Notice of Allowance dated Jan. 30, 2014 issued in connection with U.S. Appl. No. 12/202,091.
Notice of Allowance dated Feb. 27, 2014 issued in connection with U.S. Appl. No. 13/715,765.
Notice of Allowance dated Feb. 3, 2014 issued in connection with U.S. Appl. No. 13/221,692.
Notice of Allowance dated Mar. 18, 2014 issued in connection with U.S. Appl. No. 14/032,657.
Notice of Allowance dated Mar. 27, 2014 issued in connection with U.S. Appl. No. 12/490,949.
Notice of Reasons for Rejection dated Jan. 24, 2014 issued in connection with Japanese Patent Application No. 2011-535592, with English translation.
Office Action dated Jan. 29, 2014 issued in connection with U.S. Appl. No. 14/059,248.
Office action dated Feb. 28, 2014 issued in connection with U.S. Appl. No. 12/266,446.
International Search Report mailed Jul. 9, 2013 issued in connection with PCT/US2013/33265.
Notice of Allowance dated Oct. 4, 2013 issued in connection with U.S. Appl. No. 12/202,101.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Notification of Transmittal of the International Search Report and the Written Opinion of the International Searching Authority, or the Declaration mailed Jul. 9, 2013 issued in connection with PCT/US2013/33265.
Office Action dated Oct. 21, 2013 issued in connection with U.S. Appl. No. 12/331,210.
Office Action dated Jul. 5, 2013 issued in connection with Mexican Application No. MX/a/2011/002272.
Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Aug. 28, 2013 issued in connection with Chinese Application No. 200980153730.2, with English translation.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Jul. 30, 2013 issued in connection with U.S. Appl. No. 12/331,181.
Office Action mailed Jul. 2, 2013 in connection with Mexican Application No. MX/a/2010/008238.

(56) References Cited

OTHER PUBLICATIONS

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Third Office Action dated Aug. 29, 2013 issued in connection with Chinese Application No. 2008801283369.

Written Opinion of the International Searching Authority mailed Jul. 9, 2013 issued in connection with PCT/US2013/33265.

Notice of Allowance dated Oct. 16, 2014 issued in U.S. Appl. No. 14/059,248.

Notice of Allowance dated May 28, 2014 issued in connection with U.S. Appl. No. 12/266,446.

Notice of Allowance dated Jul. 2, 2014 issued in connection with U.S. Appl. No. 12/331,195.

Notice of Allowance dated Aug. 1, 2014 issued in connection with U.S. Appl. No. 13/843,724.

Notice of Allowance dated Apr. 25, 2014 issued in connection with U.S. Appl. No. 12/202,097.

Notice of Final Rejection and Denial of Entry of Amendment dated Mar. 31, 2014 issued in connection with Japanese Application No. 2010-544399, with English translation.

Notice of Reasons for Rejected issued in connection with Japanese Patent Application No. 2011-525099 dated Jun. 19, 2014.

Office Action dated Apr. 18, 2014 issued in U.S. Appl. No. 13/843,724.

Office Action dated Jun. 30, 2014 issued in connection with U.S. Appl. No. 14/059,248.

Office action dated Jul. 31, 2014 issued in connection with U.S. Appl. No. 12/021,251.

Office action dated Aug. 28, 2014 issued in connection with Chinese Application No. 200980142771.1, with English translation.

Office action dated Aug. 14, 2014 issued in connection with U.S. Appl. No. 14/035,506.

Office action dated Apr. 17, 2014 issued in connection with Japanese Application No. 2013-117498.

Office action dated Apr. 9, 2014 issued in connection with Australian application No. 2009288509.

Office action issued in connection with European Application No. 08871835.8-1851 dated May 22, 2014.

Second Office Action dated Mar. 27, 2014 issued in connection with Chinese Application No. 20098014277.1, with English translation.

Subsequent Substantive Examination Report dated Jul. 14, 2014 issued in connection with Philippines Application No. 1-2010-501705.

Substantive Examination Report issued in connection with Philippines Application No. 1/2011/500868 dated May 2, 2014.

Supplemental Notice of Allowance dated Jun. 10, 2014 issued in connection with U.S. Appl. No. 12/202,097.

Notice of Allowance mailed Dec. 19, 2014 issued in U.S. Appl. No. 14/035,506.

Office Action dated Dec. 24, 2014 issued in connection with U.S. Appl. No. 14/472,998.

Office Action dated Dec. 4, 2014 issued in connection with U.S. Appl. No. 14/035,522.

\* cited by examiner

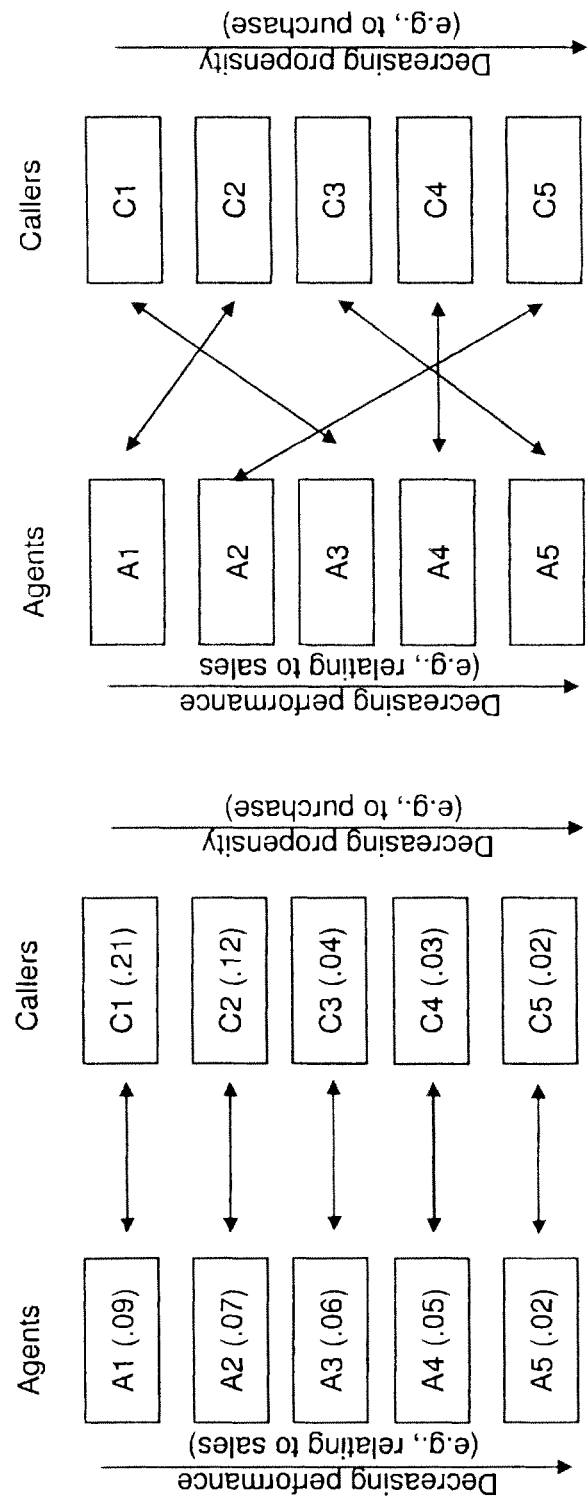

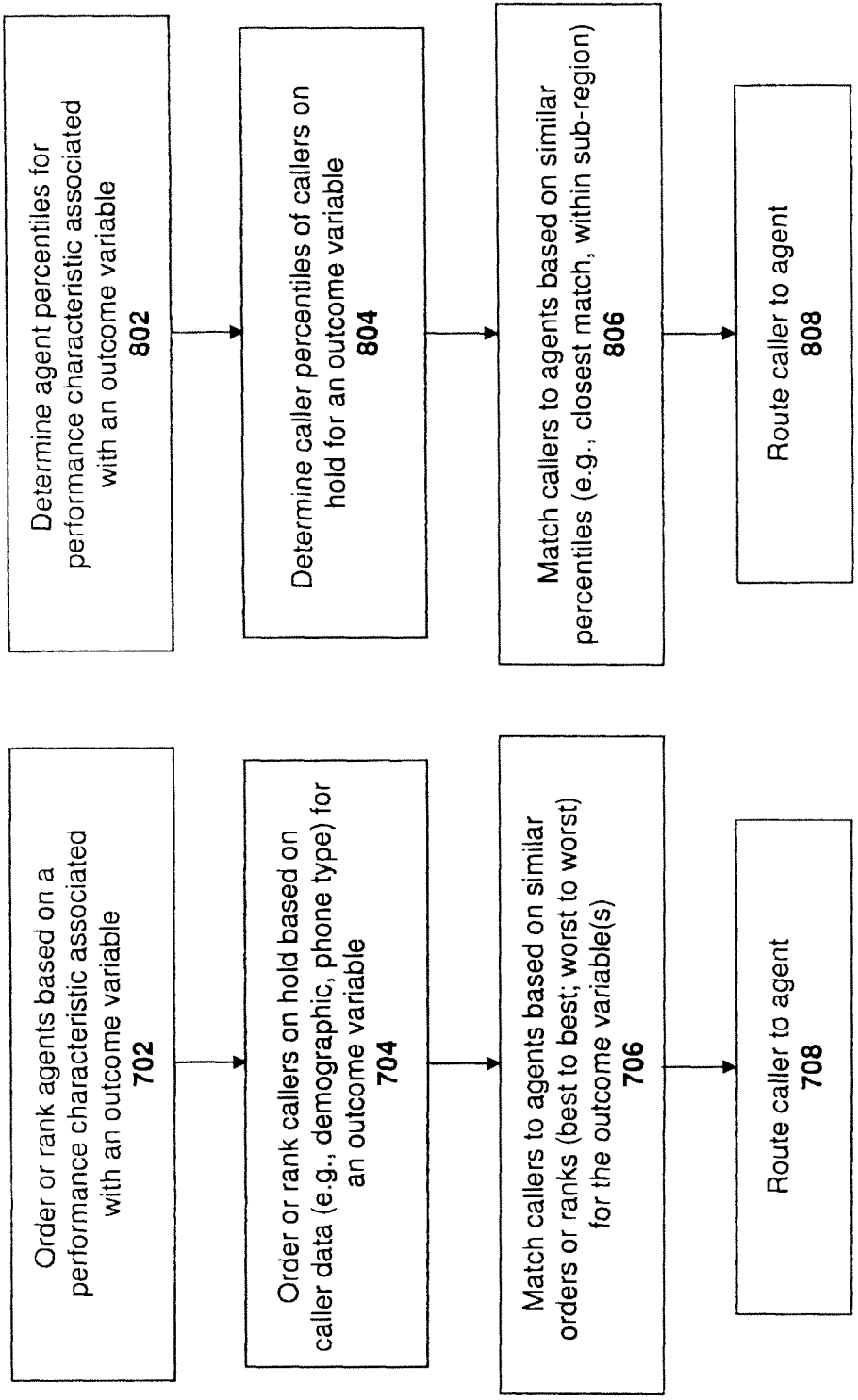

CALL MAPPING SYSTEMS AND METHODS USING BAYESIAN MEAN REGRESSION (BMR)

CROSS-REFERENCE TO RELATED PATENT APPLICATIONS

This application claims priority from Provisional U.S. Application 61/615,772 filed Mar. 26, 2012, and from Provisional U.S. Application 61/615,779 filed Mar. 26, 2012, and from Provisional U.S. Application 61/615,788 filed on Mar. 26, 2012, and U.S. application CALL MAPPING SYSTEMS AND METHODS USING VARIANCE ALGORITHM (VA) AND/OR DISTRIBUTION COMPENSATION, inventors S. James Spottiswoode and Zia Chishti, filed Mar. 15, 2013, all of which are incorporated herein by reference in their entirety as if fully set forth herein.

BACKGROUND

The present invention relates generally to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals employed by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY OF SOME EMBODIMENTS

In embodiments, a method is provided comprising: determining or obtaining or receiving, by one or more computers, a distribution of real agent performance from previous real agent performance data for a respective skill k in a set of skills; determining, by the one or more computers, a set of hypothetical agents with respective hypothetical agent performances $AP_i$ ranging from a worst performance to a best performance for the respective skill k; calculating for each of the set of hypothetical agents, by the one or more computers, a posterior distribution taking into account actual results of a respective actual agent in each of the set of skills, using the distribution of real agent performance and the set of hypothetical agents with respective hypothetical agent performances $AP_i$, to obtain a total probability for each hypothetical agent of the set of the hypothetical agents; repeating, by the one or more computers, the calculating the posterior distribution steps for multiple of the hypothetical agents in the set of hypothetical agents to obtain the respective total probabilities for the respective hypothetical agents; and determining, by the one or more computers, one of the hypothetical agents with a better value of total probability TP as the actual agent's most probable global performance.

In embodiments, the agent performance is one selected from the group of sale or no sale, revenue per call, and revenue generating units (RGU) per call, and handle time.

In embodiments, the agent skills k comprise two or more selected from the group of sales of product or service A, sales of product or service B, and providing service advice for a product C.

In embodiments, the most probable global performance determining step comprises selecting one of the hypothetical agents with a best value of total probability TP as the actual agent's most probable global performance.

In embodiments, the set of hypothetical agents comprises at least 10 hypothetical agents. In embodiments, the set of hypothetical agents comprises at least 50 hypothetical agents. In embodiments, the set of hypothetical agents comprises at least 100 hypothetical agents.

In embodiments, the real agent performance is binomial and distribution of real agent performance is truncated at least at one end thereof.

In embodiments, the calculating the posterior distribution comprises: calculating for each hypothetical agent, i, in the set of hypothetical agents, by the one or more computers, for a first skill k and the hypothetical agent performance $AP_i$ for the respective hypothetical agent, i, a probability of the evidence $POE_{ik}$ that the respective hypothetical agent i would obtain S sales on N calls, that the respective actual agent in that skill k obtained; and calculating, by the one or more computers, a total probability $TP_i$ for the hypothetical agent i, comprising multiplying $AP_i$ for the hypothetical agent by the $POE_{ik}$ for each skill k for the hypothetical agent i.

In embodiments, the method may further comprise: using, by the one or more computers, demographic data or psychographic data of the agents and demographic data or psychographic data of the callers in a multi-element pattern matching algorithm in a pair-wise fashion for a desired outcome to obtain a valuation for each of multiple of agent-caller pairs, and combining, by the one or more computers, results of the pattern matching algorithm and the respective most probable global performances of the respective agents to select one of the agent-caller pairs.

In embodiments, a method is provided, comprising: determining or obtaining or receiving, by one or more computers, a distribution of real caller propensity from previous real caller propensity data for a respective caller partition in a set of caller partitions; determining, by the one or more computers, a set of hypothetical callers with respective hypothetical caller propensities $CP_i$ ranging from a worst propensity to a best propensity; calculating for each of the set of hypothetical callers, by the one or more computers, a posterior distribution taking into account actual results of a respective actual caller in multiple of the caller partitions, using the distribution of real caller propensity and the set of hypothetical callers with respective hypothetical caller propensities $CP_i$ to obtain a total probability for each hypothetical caller of the set of the respective hypothetical callers; repeating, by the one or more computers, the calculating the posterior distribution steps for multiple of the hypothetical callers in the set of hypothetical callers to obtain the respective total probabilities for the respective hypothetical callers; and determining, by the one or more computers, one of the hypothetical callers with a better value of total probability TP as the actual callers's most probable global propensity.

In embodiments, the caller propensity is one selected from the group of product or service A or no purchase, purchase of product or service B or no purchase, purchase of product or service C or no purchase, revenue generating units (RGU) per call, and handle time.

In embodiments, the partition is based at least in part on one or more selected from the group of demographic data, area code, zip code, NPANXX, VTN, geographic area, 800 number, and transfer number.

In embodiments, the calculating the posterior distribution comprises: calculating for each hypothetical caller, i, in the set of hypothetical callers, by the one or more computers, for a first partition and the hypothetical caller propensity $CP_i$ for the respective hypothetical caller, i, a probability of the evidence $POE_{ik}$ that the respective hypothetical caller i would have S sales, that the respective actual caller in that partition k had; and calculating, by the one or more computers, a total probability $TP_i$ for the hypothetical caller i, comprising multiplying $CP_i$ for the hypothetical caller by the $POE_{ik}$ for each partition k for the hypothetical caller i.

In embodiments, a system is disclosed comprising: one or more computers configured with program code that, when executed, causes performance of the following steps: determining or obtaining or receiving, by the one or more computers, a distribution of real agent performance from previous real agent performance data for a respective skill k in a set of skills; determining, by the one or more computers, a set of hypothetical agents with respective hypothetical agent performances $AP_i$ ranging from a worst performance to a best performance for the respective skill k; calculating for each of the set of hypothetical agents, by the one or more computers, a posterior distribution taking into account actual results of a respective actual agent in the set of skills, using the distribution of real agent performance and the set of hypothetical agents with respective hypothetical agent performances $AP_i$, to obtain a total probability for each hypothetical agent of the set of the hypothetical agents; repeating, by the one or more computers, the calculating the posterior distribution steps for multiple of the hypothetical agents in the set of hypothetical agents to obtain the respective total probabilities for the respective hypothetical agents; and determining, by the one or more computers, one of the hypothetical agents with a better value of total probability TP as the actual agent's most probable global performance.

In embodiments, a system is disclosed, comprising: one or more computers configured with program code that, when executed, causes performance of the following steps: determining or obtaining or receiving, by the one or more computers, a distribution of real caller propensity from previous real caller propensity data for a respective caller partition in a set of caller partitions; determining, by the one or more computers, a set of hypothetical callers with respective hypothetical caller propensities $CP_i$ ranging from a worst propensity to a best propensity; calculating for each of the set of hypothetical callers, by the one or more computers, a posterior distribution taking into account actual results of a respective actual caller in multiple of the caller partitions, using the distribution of real caller propensity and the set of hypothetical callers with respective hypothetical caller propensities $CP_i$, to obtain a total probability for each hypothetical caller of the set of the respective hypothetical callers; repeating, by the one or more computers, the calculating the posterior distribution steps for multiple of the hypothetical callers in the set of hypothetical callers to obtain the respective total probabilities for the respective hypothetical callers; and determining, by the one or more computers, one of the hypothetical callers with a better value of total probability TP as the actual callers's most probable global propensity.

In embodiments, a program product is provided comprising: a non-transitory computer-readable medium configured with computer-readable program code, that when executed, by one or more computers, causes the performance of the steps: determining or obtaining or receiving, by the one or more computers, a distribution of real agent performance from previous real agent performance data for a respective skill k in a set of skills; determining, by the one or more computers, a set of hypothetical agents with respective hypothetical agent performances $AP_i$ ranging from a worst performance to a best performance for the respective skill k; calculating for each of the set of hypothetical agents, by the one or more computers, a posterior distribution taking into account actual results of a respective actual agent in each of the set of skills, using the distribution of real agent performance and the set of hypothetical agents with respective hypothetical agent performances $AP_i$, to obtain a total probability for each hypothetical agent of the set of the hypothetical agents; repeating, by the one or more computers, the calculating the posterior distribution steps for multiple of the hypothetical agents in the set of hypothetical agents to obtain the respective total probabilities for the respective hypothetical agents; and determining, by the one or more computers, one of the hypothetical agents with a better value of total probability TP as the actual agent's most probable global performance.

In embodiments, a program product is provided comprising: a non-transitory computer-readable medium configured with computer-readable program code, that when executed, by one or more computers, causes the performance of the steps: determining or obtaining or receiving, by one or more computers, a distribution of real caller propensity from previous real caller propensity data for a respective caller partition in a set of caller partitions; determining, by the one or more computers, a set of hypothetical callers with respective hypothetical caller propensities $CP_i$ ranging from a worst propensity to a best propensity; calculating for each of the set of hypothetical callers, by the one or more computers, a posterior distribution taking into account actual results of a respective actual caller in multiple of the caller partitions, using the distribution of real caller propensity and the set of hypothetical callers with respective hypothetical caller propensities $CP_i$, to obtain a total probability for each hypothetical caller of the set of the respective hypothetical callers; repeating, by the one or more computers, the calculating the posterior distribution steps for multiple of the hypothetical callers in the set of hypothetical callers to obtain the respective total probabilities for the respective hypothetical callers; and determining, by the one or more computers, one of the hypothetical callers with a better value of total probability TP as the actual callers's most probable global propensity.

The examples can be applied broadly to different processes for matching callers and agents. For instance, exemplary processes or models may include conventional queue routing, performance based matching (e.g., ranking a set of agents based on performance and preferentially matching callers to the agents based on a performance ranking or score), an adaptive pattern matching algorithm or computer model for matching callers to agents (e.g., comparing caller data associated with a caller to agent data associated with a set of agents), affinity data matching, combinations thereof, and so on. The methods may therefore operate to output scores or rankings of the callers, agents, and/or caller-agent pairs for a desired optimization of an outcome variable (e.g., for optimizing cost, revenue, customer satisfaction, and so on). In one example, different models may be used for matching callers to agents and combined in some fashion with the exemplary multiplier processes, e.g., linearly weighted and combined for different performance outcome variables (e.g., cost, revenue, customer satisfaction, and so on).

According to another aspect, computer-readable storage media and apparatuses are provided for mapping and routing callers to agents according to the various processes described herein. Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

BRIEF DESCRIPTION OF THE DRAWINGS

FIGS. 4A and 4B illustrate an exemplary probability matching process and random matching process, respectively.

FIG. 7 illustrates an exemplary probability matching process or computer model for matching callers to agents based on probabilities of outcome variables.

FIG. 8 illustrates an exemplary probability matching process or computer model for matching callers to agents based on probabilities of outcome variables.

DETAILED DESCRIPTION

Figure 1:
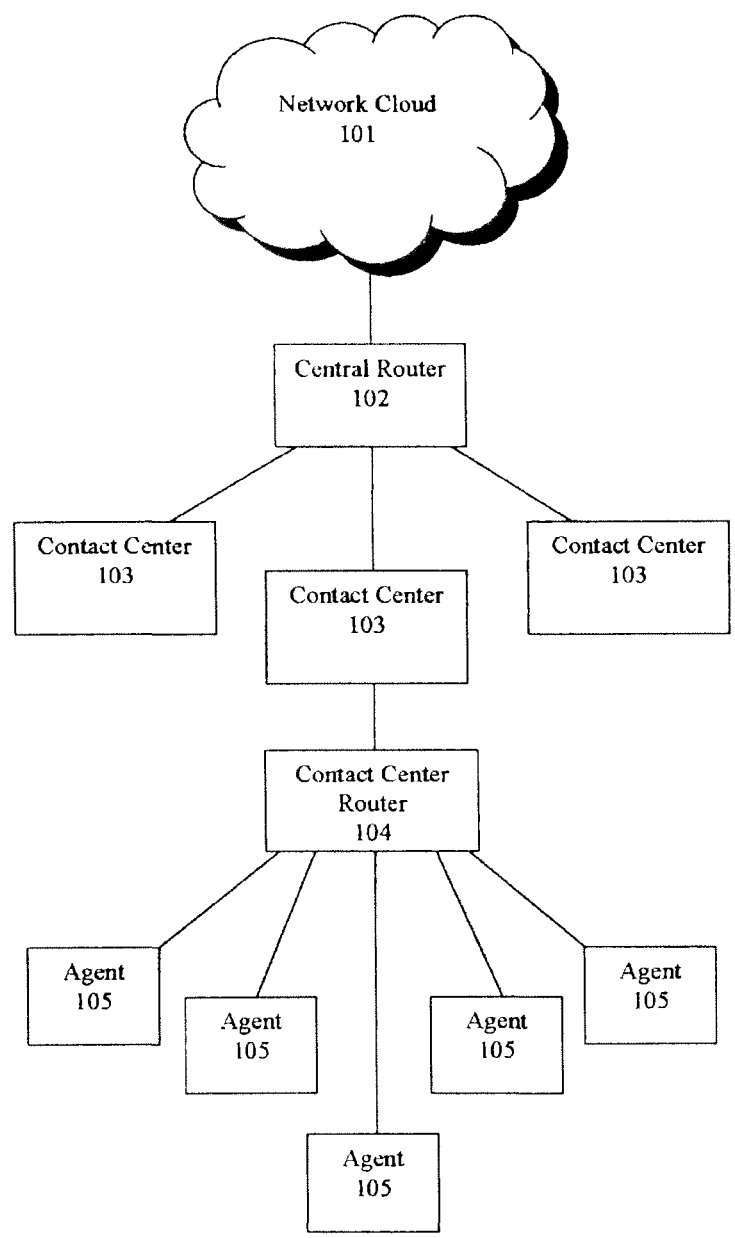
FIG. 1 is a diagram reflecting the general setup of a contact center and its operation.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof: as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to certain aspects of the present invention, systems. and methods are provided for matching callers to agents within a call routing center based on similar rankings or relative probabilities for a desired outcome variable. In one example, an exemplary probability multiplier process include matching the best agents to the best callers, the worst agents to worst callers, and so on, based on the probability of a desired outcome variable. For instance, agents may be scored or ranked based on performance for an outcome variable such as sales, customer satisfaction, cost, or the like. Additionally, callers can be scored or ranked for an outcome variable such as propensity or statistical chance to purchase (which may be based on available caller data, e.g., phone number, area code, zip code, demographic data, type of phone used, historical data, and so on). Callers and agents can then be matched according to their respective rank or percentile rank; for example, the highest ranking agent matched with the highest ranking caller, the second highest ranked agent with the second highest caller, and so on.

The exemplary probability multiplier process takes advantage of the inherent geometric relationship of multiplying the different probabilities, for example, a 30% sales rate agent with a 30% buying customer (giving you a total chance of 9%) as opposed to matching a 20% or 10% sales rate agent with that same customer (resulting in a 6% or 3% chance). When used across all agents and callers, the process results in a higher overall predicted chance of a particular outcome variable, such as sales, than a random matching process.

In one example, in addition to using relative ranks of agents and callers to match callers to agents, a pattern matching algorithm using agent and/or caller demographic data may be used. For instance, agents and callers may be matched based on demographic data via a pattern matching algorithm, such as an adaptive correlation algorithm. The caller-agent matches from the probability multiplier algorithm and pattern matching algorithms can be combined, e.g., linearly combined with or without weightings, to determine a final match for routing a caller to an agent.

Initially, exemplary call routing systems and methods are described for matching callers to available agents. This description is followed by exemplary systems and methods for ranking or ordering callers and agents based on an outcome variable, e.g., sales, customer satisfactions, or the like, and matching agents to callers based on the relative rankings. For instance, matching the highest ranking agent for a particular outcome variable with the highest ranking caller for a particular outcome variable, matching the lowest ranking agent with the lowest ranking caller, and so on.

FIG. 1 is a diagram reflecting the general setup of a typical contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contact addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103.

Figure 2:
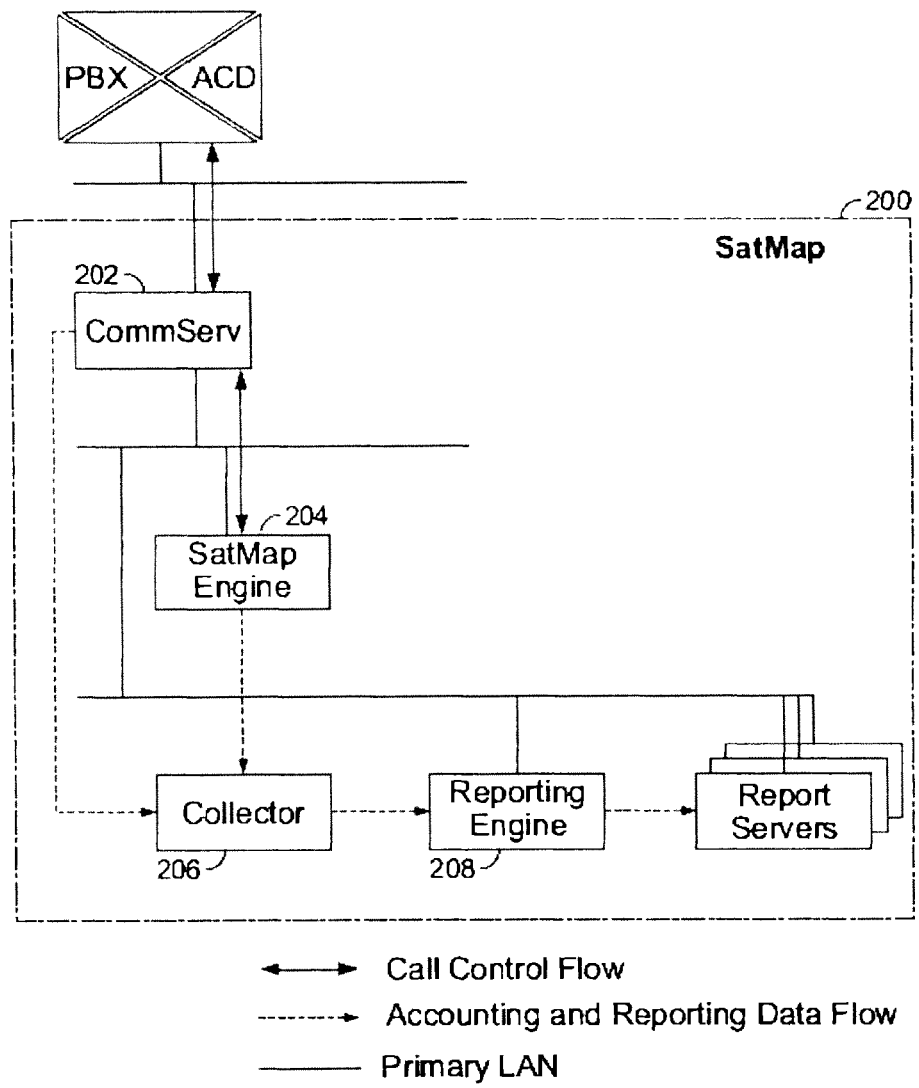
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part and in one example, on a probability multiplier process based on agent performance and caller propensity (e.g., statistical chance or likelihood) for a particular outcome variable. Routing system 200 may further be operable to match callers based on pattern matching algorithms using caller data and/or agent data alone or in combination with the probability multiplier process. Routing system 200 may include a communication server 202 and a routing engine 204 for receiving and matching callers to agents (referred to at times as "mapping" callers to agents).

In one example, and as described in greater detail below, routing engine 204 is operable to determine or retrieve performance data for available agents and caller propensity for an outcome variable from callers on hold. The performance data and caller propensity data may be converted to percentile ranks for each and used to match callers to agents based on the closest match of percentile ranks, respectively, thereby resulting in high performing agents matched to callers with a high propensity to purchase, for example.

Agent data may include agent grades or rankings, agent historical data, agent demographic data, agent psychographic data, and other business-relevant data about the agent (individually or collectively referred to in this application as "agent data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It is further noted that certain data, such an area code, may provide statistical data regarding probable income level, education level, ethnicity, religion, and so on, of a caller which may be used by the exemplary process to determine a propensity of caller for a particular outcome variable, for example.

Additionally, in some examples, routing engine 204 may additionally include pattern matching algorithms and/or computer models, which may adapt over time based on the performance or outcomes of previous caller-agent matches.

The additional pattern matching algorithms may be combined in various fashions with a probability multiplier process to determine a routing decision. In one example, a pattern matching algorithm may include a neural network based adaptive pattern matching engine as is known in the art; for example, a resilient backpropagation (RProp) algorithm, as described by M. Riedmiller, H. Braun: "A Direct Adaptive Method for Faster backpropagation Learning: The RPROP Algorithm," Proc. of the IEEE Intl. Cont'. on Neural Networks 1993, which is incorporated by reference herein in its entirety. Various other exemplary agent performance and pattern matching algorithms and computer model systems and processes which may be included with contact routing system and/or routing engine 204 are described, for example, in U.S. Ser. No. 12/021,251, filed Jan. 28, 2008, and U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, historical performance data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
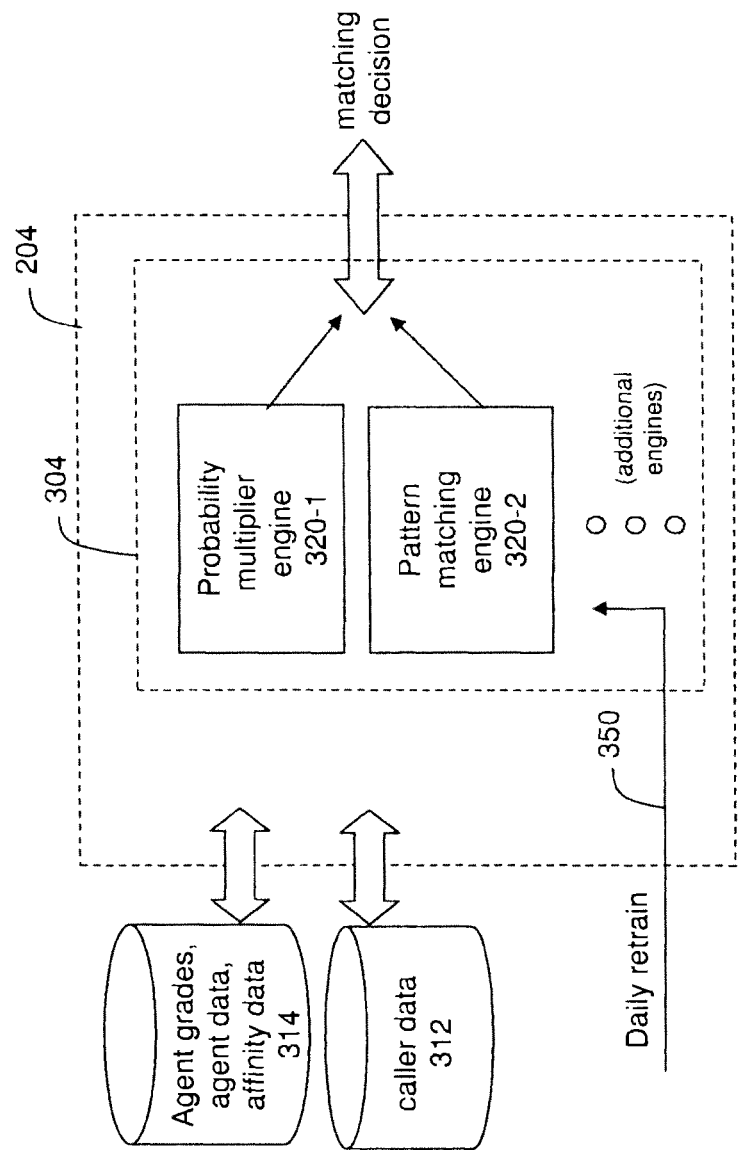
FIG. 3 illustrates an exemplary routing system having a mapping engine for matching callers to agents based on a probability multiplier process alone or in combination with one or more additional matching processes.

FIG. 3 illustrates further detail of exemplary routing engine 204. Routing engine 204 includes a main mapping engine 304, which may include one or more mapping engines therein for use alone or in combination with other mapping engines. In some examples, routing engine 204 may route callers based solely or in part on performance data associated with agents and caller data associated with the propensity or chances of a particular outcome variable. In other examples, routing engine 204 may further make routing decisions based solely or in part on comparing various caller data and agent data, which may include, e.g., performance based data, demographic data, psychographic data, type of phone/phone number, BTN-data, and other business-relevant data. Additionally, affinity databases (not shown) may be used and such information received by routing engine 204 and/or mapping engine 304 for making or influencing routing decisions. Database 312 may include local or remote databases, third party services, and so on (additionally, mapping engine 304 may receive agent data from database 314 if applicable for the particular mapping process).

In one example, relative agent performance may be determined by ranking or scoring a set of agents based on performance for a particular outcome variable (such as revenue generation, cost, customer satisfaction, combinations thereof, and the like). Further, the relative agent performance may be converted to a relative percentile ranking. Processing engine 320-1, for example, may determine or receive relative agent performance data for one or more outcome variables. Additionally, processing engine 320-1 may receive or determine a propensity of a caller for a particular outcome variable (such as propensity to purchase, length of call, to be satisfied, combinations thereof, and the like). The propensity of a caller may be determined from available caller data. The relative performance data of the agents and propensity data of the callers may then be used to match a caller and an agent based on corresponding ranking. In some examples, the performance and propensity data is converted to relative percentile rankings for the callers and agents, and matching callers and agents based on the closest respective relative percentiles.

Processing engine 320-2, in one example, includes one or more pattern matching algorithms, which operate to compare available caller data with a caller to agent data associated a set of agents and determine a suitability score of each caller-agent pair. Processing engine 320-2 may receive caller data and agent data from various databases (e.g., 312 and 314) and output caller-agent pair scores or a ranking of caller-agent pairs, for example. The pattern matching algorithm may include a correlation algorithm such as a neural network algorithm, genetic algorithm, or other adaptive algorithm(s).

Additionally, a processing engine may include one or more affinity matching algorithms, which operate to receive affinity data associated with the callers and/or agents. Affinity data and/or affinity matching algorithms may be used alone or in combination with other processes or models discussed herein.

Routing engine 204 may further include selection logic (not shown) for selecting and/or weighting one or more of the plurality of processing engines 320-1 and 320-2 for mapping a caller to an agent. For example, selection logic may include rules for determining the type and amount of caller data that is known or available and selecting an appropriate processing engine 320-1,320-2, etc., or combinations thereof. Selection logic may be included in whole or in part with routing engine 204, mapping engine 304, or remotely to both.

Further, as indicated in FIG. 3 at 350, call history data (including, e.g., caller-agent pair data and outcomes with respect to cost, revenue, customer satisfaction, and so on) may be used to retrain or modify processing engines 320-1 and 320-2. For instance, the agent performance data may be updated periodically (e.g., daily) based on historical outcomes to re-rank the agents. Further, historical information regarding callers may be used to update information regarding caller propensities for particular outcome variables.

In some examples, routing engine 204 or main mapping engine 304 may further include a conventional queue based routing processes, which may store or access hold or idle times of callers and agents, and operate to map callers to agents based on a hold time or queue order of the callers (and/or agents). Further, various function or time limits may be applied to callers on hold to ensure that callers are not held too long awaiting an agent. For instance, if a caller's time limit (whether based on a predetermined value or function related to the caller) is exceeded the caller can be routed to the next available agent.

Additionally, an interface may be presented to a user allowing for adjustment of various aspects of the exemplary systems and methods, for example, allowing adjustments of the number of different models, degrees, and types of caller data. Further, an interface may allow for the adjustment of the particular models used for different degrees or types, for example, adjusting an optimization or weighting of a particular model, changing a model for a particular degree or type of caller data, and so on. The interface may include a slider or selector for adjusting different factors in real-time or at a predetermined time. Additionally, the interface may allow a user to turn certain methods on and off, and may display an estimated effect of changes. For instance, an interface may display the probable change in one or more of cost, revenue generation, or customer satisfaction by changing aspects of the routing system. Various estimation methods and algorithms for estimating outcome variables are described, for example, in co-pending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the performance based matching, pattern matching algorithm, etc., and applied to current information to estimate current performance (e.g., with respect to one or more of sales, cost, customer satisfaction, etc.). Accordingly, taking historical call data and agent information the system can compute estimates of changing the balance or weighting of the processing methods. It is noted that a comparable time (e.g., time of day, day of the week etc.) for the historical information may be important as performance will likely vary with time.

FIG. 4A schematically illustrates an exemplary probability multiplier process for matching callers and agents and FIG. 4B illustrates a random matching process (e.g., queue based or the like). These illustrative examples assume that there are five agents and five callers to be matched. The agents can be ranked based on performance of a desired outcome variable. For instance, the agents may be scored and ordered based on a statistical chance of completing a sale based on historical sales rate data. Additionally, the callers can be scored and ranked based on a desired outcome variable, for example, on a propensity or likelihood to purchase products or services. The callers may be ranked and ordered based on known or available caller data including, for example, demographic data, zip codes, area codes, type of phone used, and so on, which are used to determine a statistical or historical chance of the caller making a purchase.

The agents and callers are then matched to each other based on the ranking, where the highest ranked agent is matched to the highest ranked caller, the second highest ranked agent matched to the second highest ranked caller, and so on. Matching the best to the best and worst to the worst results in an increase product of the matched pairs compared to randomly matching callers to agents as shown in FIG. 4B. For instance, using illustrative sales rates for agents A1-A5 (e.g., based on past agent performance) and the chance of callers C1-C5 making a purchase (e.g., based on caller data such as demographic data, caller data, and so on), the product of the matches shown in FIG. 4A is as follows:

(0.09*0.21)+(0.07*0.12)+(0.06*0.04)+(0.05*0.03)+
  (0.02*0.02)0.0316

In contrast, for a random matching, as illustrated in FIG. 4B and using the same percentages, the product is as follows:

(0.09*0.12)+(0.07*0.02)+(0.06*0.21)+(0.05*0.03)+
  (0.02*0.04)0.0271

Accordingly, matching the highest ranking agent with the highest ranking caller and the worst ranking agent with the worst ranking caller increases the overall product, and thus chances of optimizing the desired outcome variable (e.g., sales).

Figures 5A, 5B:
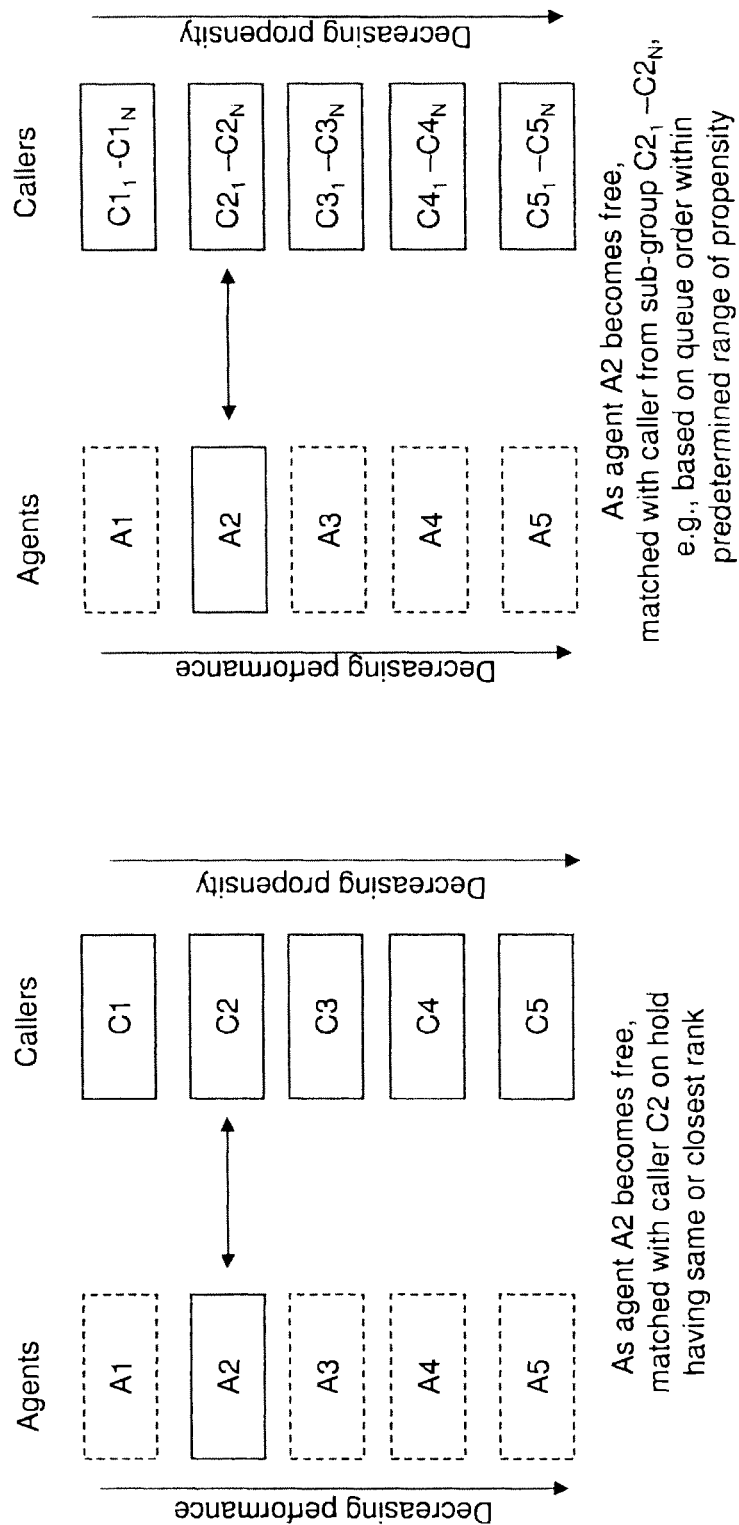
FIGS. 5A and 5B illustrate exemplary probability matching processes for matching a caller to an agent.

FIG. 5A schematically illustrates an exemplary process for matching callers on hold to an agent that becomes free. In this example, all agents A1-A5 on duty or all that might become free within a reasonable hold time of callers C1-C5 are scored or ranked as previously described. Additionally, callers C1-C5 are scored or ranked as previously described. As an agent, e.g., agent A2 becomes free the process determines that caller C2 is the same (or similar) rank as agent A2 and caller C2 is matched thereto. The remaining callers on hold may then be re-ranked for matching when the next agent becomes free. Additionally, as new callers are placed on hold the callers can be reranked in a real-time fashion. The exemplary process operates in a similar fashion for multiple free agents and a caller becomes free (both for inbound and outbound call centers).

It will be recognized that in most instances the number of agents and callers will not be equal. Accordingly, the callers (and/or agents) can be ranked and converted to relative percentile rankings for the callers; for example, a normalized ranking or setting the highest ranked caller as the $100^{th}$ percentile and the lowest ranked caller as the $0^{th}$ percentile. The agents may be similarly converted to relative percentile rankings. As an agent becomes free, the agent may be matched to the caller having the closest relative percentile rank to the agent's relative percentile rank. In other examples, as an agent becomes free the agent can be compared to the ranking of at least a portion of callers on hold to compute Z-scores for each agent-caller pair. The highest Z-score may correspond to the smallest difference in relative percentile rankings. Further, as noted herein, the Zscores may be used to combine the matching with other algorithms such as pattern matching algorithms, which may also output a Z-score.

FIG. 5B schematically illustrates exemplary methods for matching callers and agents when an agent becomes free and multiple callers are on hold. In this example, the callers (and in some examples the agents) are grouped in sub-groups of performance. For instance, a range of caller performance may be divided into multiple sub-groups and callers bucketed within each group. The top 20% of callers by performance might be grouped together as $C1_1$-$C1_N$ as illustrated, followed by the next 20%, and so on. As an agent becomes free, e.g., A2, a caller from an appropriate sub-group is matched to the caller, in this example from $C2_1$-$C2_N$. Within the sub-group the caller may be chosen by a queue order, best-match, a pattern matching algorithm, or the like. The appropriate sub-group from which to route a caller may be determined based on the agent ranking or score, for example.

In one example, suppose it is desired to optimize a call center performance for Outcome variable O. O can include one or more of sales rate, customer satisfaction, first call resolution, or other variables. Suppose further that at some time there are $N_A$ agents logged in and $N_C$ callers in queue. Suppose that agents have performances in generating O of $$A_i^O\; i=1,\ldots,N_A$$

and callers, partitioned by some property P, have a propensity to O of $$C_i^O\; i=1,\ldots,N_C$$

For example, in the case where O is sales rate and P is caller area code, $A^O$ is each agent's sales rate and $C^O$ is the sales rate for callers in a particular area code. Calculating the percentile ranked agent performances (with respect to the set of logged in agents) and the percentile ranked caller propensities (with respect to the set of callers in queue at some instant of time) as follows:

$$A_{Pi}^O = pr(A_i^O, A^O)\; (i=1,\ldots,N_A)$$

$$C_{Pi}^O = pr(C_i^O, C^O)\; (i=1,\ldots,N_C)$$

where pr(a, B) is the percentile rank function which returns the rank of value a with respect to the set of values B scaled into the range [0,100].

Suppose that all the agents are on calls when the k'th agent becomes available. Then to determine which caller in the queue they should be connected to, compute the difference between the percentile ranks of the newly free k'th agent and those of the callers in queue:

$$D_j = A_{Pk}^O - C_{Pj}^O \ (j=1, \ldots, N_C)$$

The value of j indexing the minimum element of the set $\{D_j\}$ gives the member of the queue to connect to the k'th agent. A Z-score can also be derived from the $D_j$. This has the advantages that the highest value agent-caller pairing is the best fit of the set and that the output from this algorithm can be combined with Z-score outputs from other algorithms since they have the same scale.

$$Z_j = (T_j - \mu)/\sigma$$

where $\mu$ and $\sigma$ and the mean and standard deviation of T which is given by:

$$T_j = \text{Min}(D_j) - D_j$$

It will be recognized by those of skill in the art that the above example and algorithm described for the case of two variables is not restricted to the case of two variables, but can be extended in an obvious way to the case of more than two variables which are monotonically related to the desired outcome. Furthermore the increase in call center performance can be shown to increase with more variables, as will be understood and contemplated by those of ordinary skill in the art.

Figure 6A:
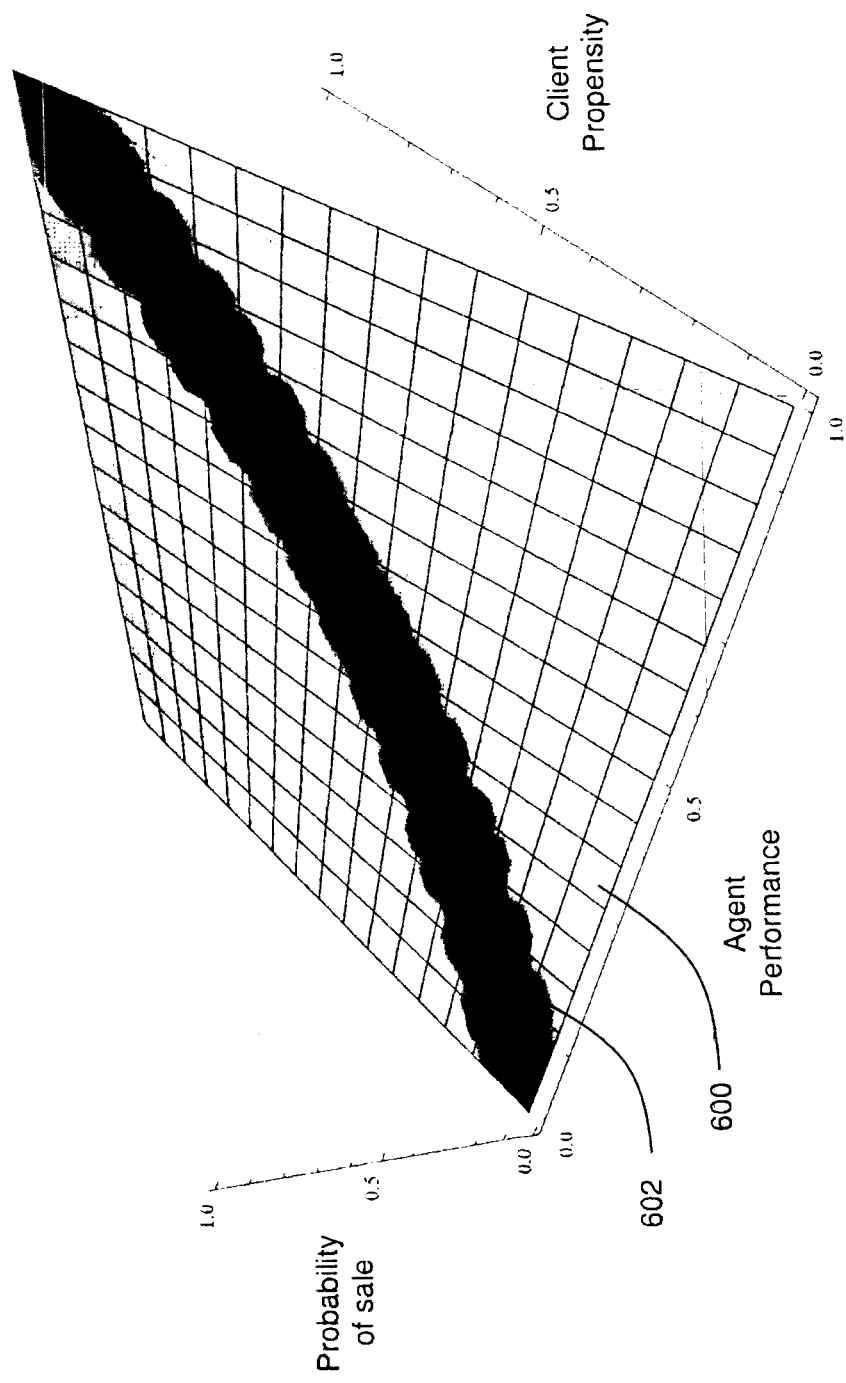
FIGS. 6A and 6B illustrate exemplary three-dimensional plots of agent performance, client propensity, and the probability of a sale for particular caller-agent pairings.

FIG. 6A illustrates an exemplary three-dimensional plot of agent performance versus caller propensity along the x-axis and y-axis and the probability of a sale along the z-axis. In this example, agent performance and caller propensity are defined as linear functions of x and y. For instance, without loss of generality, $x \in [0,1]$ and $y \in [0,1]$, such that the agent propensity is:

$$a = ca + max$$

where "ca" and "ma" represent the intercept and slope for the agent performance linear function (note that in certain instances herein, multiple letters represent a single variable e.g., "ca" and "ma" are each single variables, and are offset by other letters to indicate a multiplication operator). Similarly for the caller propensity:

$$c = cc + mcy$$

where "cc" and "mc" represent the intercept and slope for the caller propensity linear function. The multiplicative model probability of sale p of the product of a and c is:

$$p = ac$$

The average height d of a surface of the probability of a sale, which is graphically illustrated in FIG. 6A as surface 600, can be computed as follows:

$$d = \int_0^1 \int_0^1 p \, dx \, dy = \frac{1}{4}(2ca + ma)(2cc + mc)$$

Determining the average height n of the diagonal of the surface height "pdiag" (a single variable), which corresponds to multiplying similar percentile ranking agents against callers is as follows:

$$pdiag = (ca + ma\lambda)(cc + mc\lambda);$$

$$n = \int_0^1 pdiag \, d\lambda = ca \, cc + \frac{ca \, mc}{2} + \frac{cc \, ma}{2} + \frac{ma \, mc}{3}$$

where $\lambda$ parametrises the diagonal function so one can integrate down the line.

The boost b, or the potential increase in performance or sales rate according to the probability matching by corresponding rates, as illustrated by the diagonal shaded band 602 on surface 600, can be computed as follows:

$$b = n/d - 1 = \frac{4\left(ca \, cc + \frac{ca \, mc}{2} + \frac{cc \, ma}{2} + \frac{ma \, mc}{3}\right)}{(2ca + ma)(2cc + mc)} - 1$$

where the theoretical maximum boost of matching according to probability, for this illustrative example, is ⅓. Accordingly, matching callers to agents on or near diagonal shaded band 602 increases the probability of sales.

Figure 6B:
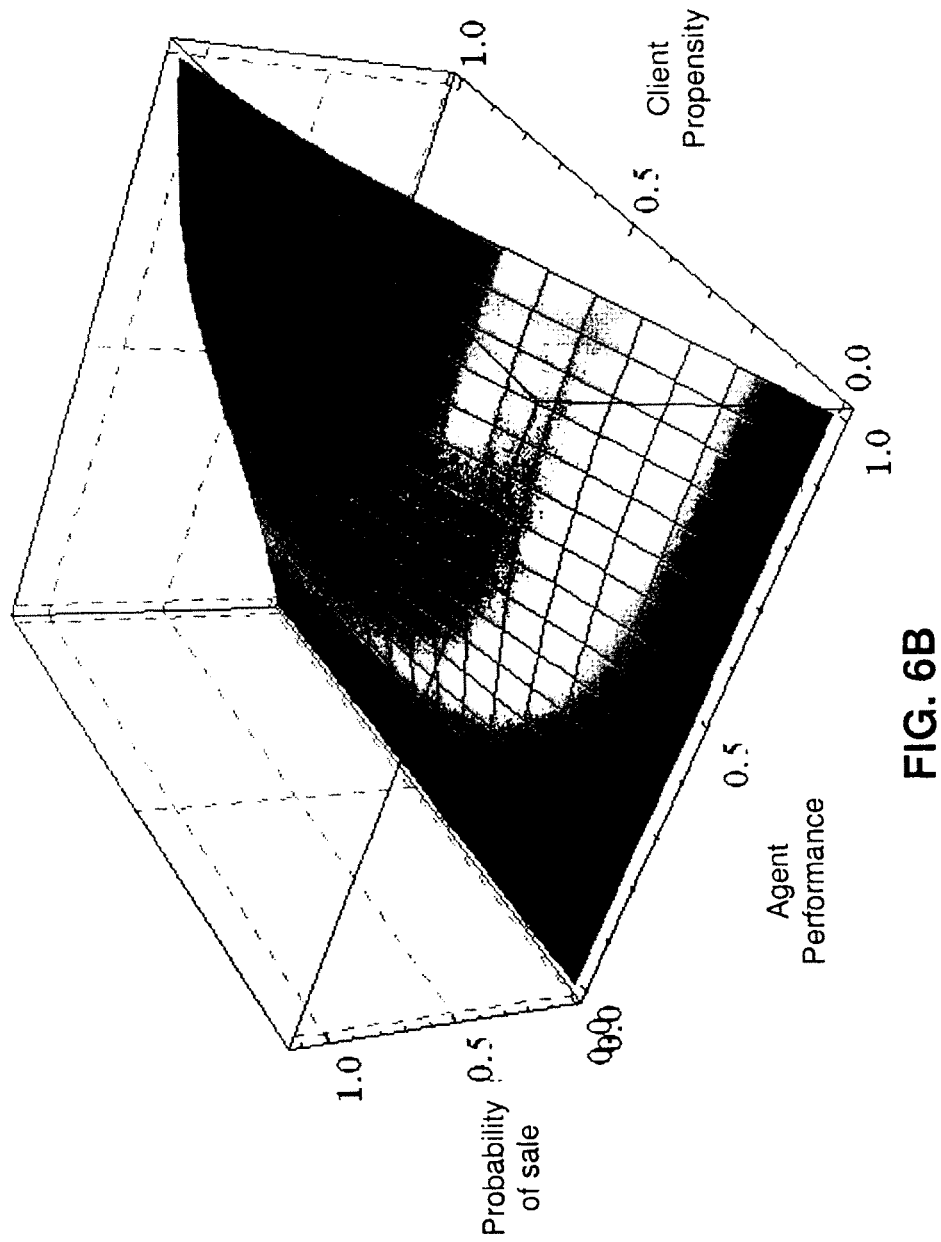

FIG. 6B illustrates an exemplary analysis and plot for normal distribution of callers and agents for agent performance and caller propensity (as opposed to a uniform distribution of performance). Assuming the same definitions of agent performance and caller propensity, a two dimensional Gaussian function can be used to represent the distribution of call frequencies across the agents' performance and callers' propensities:

$$g2d(x, y, x0, y0, \sigma) = e^{\frac{-(x-x0)^2 - (y-y0)^2}{2\sigma^2}}$$

The sales rate can then be represented by a function of a and c, where A and $\sigma$ give the amplitude and standard deviation of the Gaussian component respectively. Assuming that the Gaussian is centered at $\{0.5, 0.5\}$, the probability can be written as:

$$p = ac\left(1 + A g2d\left(x, y, \frac{1}{2}, \frac{1}{2}, \sigma\right)\right) =$$

$$(ca + max)(cc + mcy)\left(Ae^{\frac{-(x-\frac{1}{2})^2 - (y-\frac{1}{2})^2}{2\sigma^2}} + 1\right)$$

The diagonal sales rate, d, can then be determined directly from the sales rate as:

$$d(x, ca, ma, cc, mc, \sigma, x) = \left(Ae^{-\frac{(x-\frac{1}{2})^2}{\sigma^2}} + 1\right)(ca + max)(cc + mcx)$$

Integrating this with respect to x over [0,1] gives the sales rate for call agent pairs occurring on the diagonal giving:

$$\frac{1}{12}e^{-\frac{1}{4\sigma^2}}\left(e^{\frac{1}{4\sigma^2}}\left(2\sqrt{\pi} \, A\sigma \text{erf}\left(\frac{1}{2\sigma}\right)\right)((2ca + ma)(2cc + mc) + 2ma \, mc\sigma^2) + 6ca(2cc + mc) + 6cc \, ma + 4ma \, mc\right) - 6Ama \, mc\sigma^2\right)$$

The sales rate for random client agent pairings can be computed as:

totalsalesrate$[ca\_,ma\_,cc\_,mc\_,\sigma\_,A\_]=\int_0\int_0$ salesrate$[x,y,ca,ma,cc,mc,\sigma,A]dxdy$ which expands to:

$$\frac{1}{4}(2ca+ma)(2cc+mc)\left(2\pi A\sigma^2 erf\left(\frac{1}{2\sqrt{2}\,\sigma}\right)^2+1\right)$$

and the boost of the algorithm can be computed as follows:

normalboost$[ca\_,ma\_,cc\_,mc\_,\sigma\_,A\_]$=diagintegral $[ca,ma,cc,mc,\sigma,A]$/totalsalesrate$[ca,ma,cc,mc,\sigma,A]-1$ which results in a boost in sales of:

$$e^{-\frac{1}{4\sigma^2}}\left(e^{\frac{1}{4\sigma^2}}\left(3\sqrt{\pi}\,A\sigma erf\left(\frac{1}{2\sigma}\right)\right)((2ca+ma)(2cc+mc)+2ma\,mc\sigma^2)+\frac{6ca(2cc+mc)+6cc\,ma+4ma\,mc}{3(2ca+ma)(2cc+mc)\left(2\pi A\sigma^2 erf\left(\frac{1}{2\sqrt{2}\,\sigma}\right)^2+1\right)}-6Ama\,mc\sigma^2\right)-1$$

Accordingly, and similar to the normal distribution of FIG. 6A, matching callers to agents on or near diagonal shaded band 602 increases the probability of sales. Of course, it will be understood that the exemplary functions, assumptions, and distributions of caller performance and agent propensity are illustrative, and will vary based on, e.g., historical data, feedback, and the like. Further, additional considerations and variables may be incorporated into the general processes. Note also that while referring to Sales as the variable to optimize in the above example, the same procedure can be applied to other variables or combinations thereof which are to be optimized such as call handle time (e.g. cost), or first call resolution, or many others.

To the extent that there is a discrepancy in any of the foregoing equations as compared to application Ser. No. 12/490,949, the equations of application Ser. No. 12/490,949 are the correct equations and take precedence. FIG. 7 illustrates an exemplary process for matching callers to agents within a call routing center. In this example, agents are ranked based on a performance characteristic associated with an outcome variable such as sales or customer satisfaction at 702. In some examples agent performance may be determined for each agent from historical data over a period of time. In other examples, the method may merely retrieve or receive agent performance data or agent ranking for the agents.

In one example, agents are graded on an optimal interaction, such as increasing revenue, decreasing costs, or increasing customer satisfaction. Grading can be accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agents can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods may be used.

Callers are ranked or scored based on an outcome variable based on caller data at 704. Callers may be ranked or scored based on a predicted chance of a particular outcome based on known or available caller data. The amount and type of caller data may vary for each caller but can be used to determine a statistical chance for a particular outcome based on historical outcomes. For instance, the only data known for a caller might be an area code, which is associated with a particular propensity to purchase based on past interactions with callers from the particular area code. In some examples, there may be no data associated with the caller, in which case an average propensity or statistical chance for the particular outcome when no data is known may be used.

Callers and agents are then matched based on their respective rankings at 706. For example, matching the better agents to the better callers and so on as described. Additionally, to account for an uneven number of callers and agents either or both rankings can be adjusted or normalized and the callers and agents routed based on a closest match. For instance, the rank of an agent may be divided by the number of agents, and similarly for the callers, and the callers matched to agents based on a closest match (or within a certain range). The process may then route, or cause the routing, of the caller to the agent at 708. In other examples, the process may pass the match on to other apparatuses or processes that may use the match in other processes or use to weight with other routing processes.

FIG. 8 illustrates another exemplary process for matching callers to agents within a call routing center. In this example, agents are ranked based on a performance characteristic associated with an outcome variable such as sales or customer satisfaction and converted to a relative percentile ranking at 702. For example, the raw performance values of the agents can be converted into a relative percentile ranking; for example, a 9% sales rate might be converted to an 85% performance ranking. In other examples, the raw performance values can be converted to a standardized score or Z-score.

Callers are ranked or scored based on an outcome variable based on caller data and converted to a relative percentile ranking at 804. Similar to that of the agents, raw predicted values for the callers can be converted into a percentile ranking; for example, a 20% propensity or likelihood to purchase might be converted to a 92% percentile ranking amongst callers. In other examples, the raw values can be converted to a standardized score or Z-score.

Callers and agents are then matched based on their respective relative percentile rankings at 806. For example, the relative percentile ranking of a caller can be compared to relative percentile ranking of agents and the caller matched to the closest agent available. In examples where an agent becomes free and multiple callers are on hold the agent may be matched to the closest matching caller. In other examples, a caller may be held for a predetermined time for the best matching agent to become free and then matched and routed to the closest matching agent.

It will be recognized that various other fashions of ranking callers and agents, and matching callers to agents based on their respective rankings, are contemplated. For example, generally speaking, the exemplary processes result in higher ranking callers being routed to higher ranking agents and lower ranking callers being routed to lower ranking agents.

Figure 9:
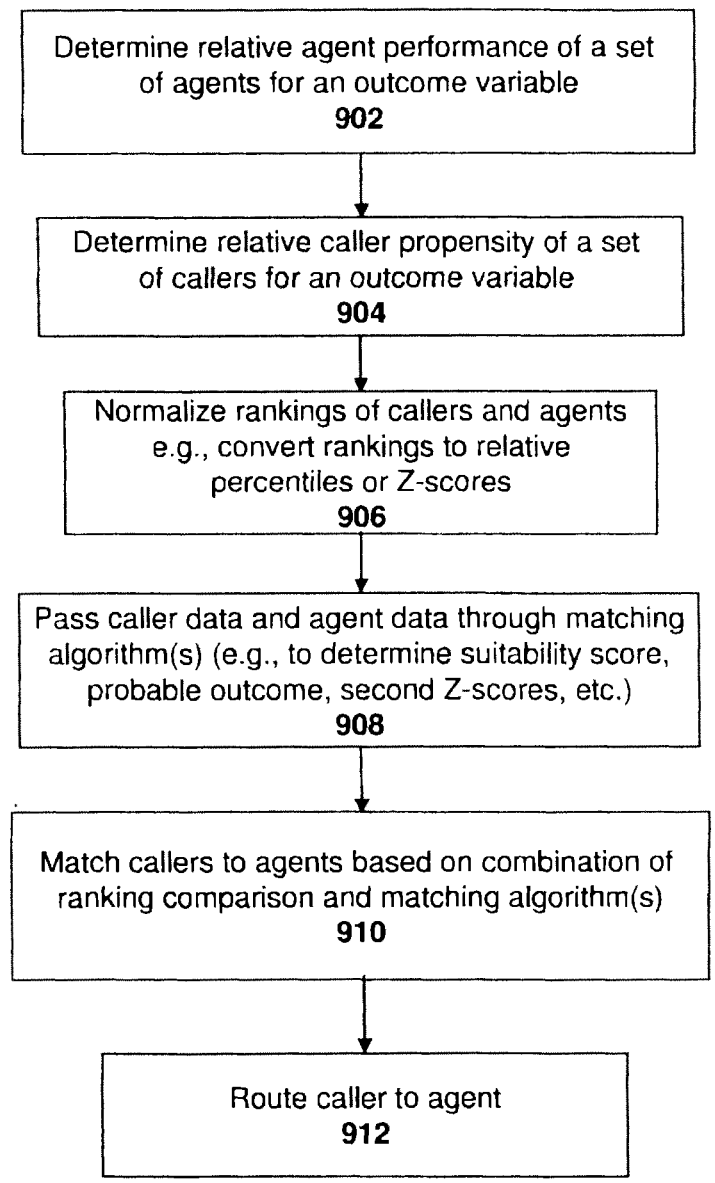
FIG. 9 illustrates an exemplary probability matching process or computer model for matching callers to agents based on probabilities of outcome variables.

FIG. 9 illustrates another exemplary process for matching callers to agents within a call routing center based on both a probability multiplier process and a pattern matching algorithm. The process includes determining relative agent performance of a set of agents for an outcome variable at 902 and determining relative caller propensity of a set of callers for the outcome variable at 904. The relative agent performance and relative caller propensity may further be normalized or converted to relative percentile rankings at 906.

A portion or all of available agent data and caller data may be passed through a pattern matching algorithm at 908. In one example, the matching algorithm includes an adaptive pattern matching algorithm such as a neural network algorithm that is trained on previous caller-agent pairing outcomes.

The matching algorithm may include comparing demographic data associated with the caller and/or agent for each caller-agent pair and computing a suitability score or ranking of caller-agent pairs for a desired outcome variable (or weighting of outcome variables). Further, a Z-score can be determined for each caller-agent pair and outcome variable(s); for instance, co-pending U.S. patent application Ser. No. 12/202,091, filed Aug. 29, 2009, describes exemplary processes for computing Z-scores for caller-agent pairs and is incorporated by reference herein in its entirety.

Exemplary pattern matching algorithms and computer models can include a correlation algorithm, such as a neural network algorithm or a genetic algorithm. In one example, a resilient backpropagation (RProp) algorithm may be used, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm can be used to create a computer model reflecting the predicted chances of an optimal interaction for each agent and caller matching. For example, the computer model may include the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, exemplary methods and systems can match every available agent with every available caller, or even a narrower subset of agents or callers. The computer model can also be further refined to comprise a suitability score for each matching of an agent and a caller.

In other examples, exemplary models or methods may utilize affinity data associated with callers and/or agents. For example, affinity data may relate to an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue; irrespective of what the matches generated using caller data and agent demographic or psychographic data may indicate.

In one example, affinity data and an affinity database developed by the described examples may be one in which a caller's contact outcomes are tracked across the various agent data. Such an analysis might indicate, for example, that the caller is most likely to be satisfied with a contact if they are matched to an agent of similar gender, race, age, or even with a specific agent. Using this example, the method could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if an exemplary method was to rely solely on commercial databases in order to match a caller and agent, it may predict that the caller would be best matched to an agent of the same gender to achieve optimal customer satisfaction. However, by including affinity database information developed from prior interactions with the caller, an exemplary method might more accurately predict that the caller would be best matched to an agent of the opposite gender to achieve optimal customer satisfaction.

Callers can then be matched to agents at 910 based on a comparison of relative rankings determined in 906 and the pattern matching algorithm at 908. For instance, outcomes of both processes may be combined, e.g., via a linear or non-linear combination, to determine the best matching caller-agent pair.

The selection or mapping of a caller to an agent may then be passed to a routing engine or router for causing the caller to be routed to the agent at 912. The routing engine or router may be local or remote to a system that maps the caller to the agent. It is noted that additional actions may be performed, the described actions do not need to occur in the order in which they are stated, and some acts may be performed in parallel.

Exemplary call mapping and routing systems and methods are described, for example, in U.S. patent application Ser. No. 12/267,471, entitled "Routing Callers to Agents Based on Time Effect Data," filed on Nov. 7, 2008; Ser. No. 12/490,949, entitled "Probability Multiplier Process for Call Center Routing," filed on Jun. 24, 2009; and Ser. No. 12/266,418, entitled, "Pooling Callers for Matching to Agents Based on Pattern Matching Algorithms," filed on Nov. 6, 2008, all of which are incorporated herein by reference.

Bayesian Mean Regression:

Systems and methods are provided herein that can be used to improve or optimize the mapping and routing of callers to agents in a contact center, where the mapping and routing of callers may use performance based routing techniques, or any matching algorithm which uses agent performance as an independent variable. In one aspect of the present invention, systems and methods are used with Bayesian Mean Regression (BMR) techniques to measure and/or estimate agent performance. See the following texts for Bayesian Mean Regression: A FIRST COURSE IN BAYESIAN STATISTICAL METHODS, Sprinter texts in Statistics, by Peter D. Hoff, Nov. 19, 2010; INTRODUCTION TO BAYESIAN STATISTICS, $2^{ND}$ Edition, by William M. Bolstad, Aug. 15, 2007; BAYESIAN STATISTICS: AN INTRODUCTION, by Peter M. lee, Sep. 4, 2012.

The example and description below is generally described in terms of agent performance (AP), however, an analogous problem exists for estimating caller propensities, for instance to purchase various different products and services, and the same methodology applies. Accordingly, to avoid repeating terms, examples will be expressed in terms of agent performances (AP) with it being understood that this could refer to caller propensity (CP) equally.

An exemplary call mapping and routing system can utilize three different mathematical types of target data. Binomial, for instance conversion rate (CR) that is sale/no sale, multinomial, e.g., a number of RGU's sold per call and continuous, e.g., revenue generating units (RGU) per call, and handle time. All the techniques described here apply to all 3 kinds of data though they need differences in the mathematical techniques used, particularly in the BMR case, as will be recognized by those of ordinary skill in the art. Again, to avoid cluttering the argument with repetition, term CR is used throughout but this should be understood to be a stand in for binomial, multinomial, or continuous data.

Typically a call routing center wishes to arrive at the most accurate measurements of agent performances (AP) that are possible given the available data. When one has large amounts of call data in a single skill the calculation is simple (e.g., CR=# sales/# calls), but problems may arise when there is relatively little data and when agents handle multiple "skills," each of which may have differing CR's. With little data it may be more accurate to take an AP value that is a weighted mixture of the raw AP and the mean AP. In the limit of no data one would then just take the mean. Conversely, with lots of data one would calculate AP from the real agent's data and ignore the mean. But the question arises as to how one handles the regressing to the mean and what is the mathematically optimal method of handling the regression to the mean. As described below, BMR is an example of handling the regression to the mean.

Bayesian Analysis in one example, may comprise a method that is an adaption of the Bayesian statistical method. The essential idea of Bayesian analysis is to combine previous knowledge ("the prior") with current evidence or data. In one example, a set of hypothetical agents which cover the range of possibilities from very high to very low performance is used. The "prior" is the probability of being an agent of a certain performance—a low probability of being very bad or very good, a higher probability to be average. The example then examines the likelihood that each of our hypothetical agents would have performed as an actual agent did. Multiplying the "prior" probability by the probability of the evidence for each hypothetical agent one can find the hypothetical agent with the highest product of prior and evidential probabilities. The actual agent is most likely to be this hypothetical agent with the highest product.

An exemplary algorithm may be carried out as followed:

1. Estimate the distribution of global (i.e. across skills) AP's. There may be some constraint; for example in embodiments, a distribution that may conform to CR, 0<=CR<=1, e.g. a truncated normal distribution, to incorporate this prior knowledge. Moments of the distribution may be estimated from previous AP data or other sources. An example distribution might be a bell curve with the apex at 0.1, with the distribution curve truncated at 0 and at 1. Such an example distribution curve might reflect that most agents have sales of 10 out of 100 calls, e.g., an apex of the distribution at 0.1.

2. Construct a set of a large number of hypothetical agents, with performances spanning the possible range of agent performance. In practice, one may generate a large number, for example, 5001, of hypothetical agents with performances ranging from the worst possible performance (possibly zero) to the greatest possible performance 100, e.g., a sale on every call. In embodiments, the performances of the hypothetical agents may be evenly spaced, e.g., 0, 0.02, 0.04, . . . , 99.96, 99.98, 100. In other embodiments, the performances may not be evenly spaced. For each hypothetical agent, for example the i'th agent, one knows two quantities: the probability of being such an agent, as determined from the distribution of global AP's of step one above, e.g., $PA_i$, and the performance of that hypothetical agent, for example $F_i$, obtained from the evenly spaced performances of the hypothetical agents.

3. For each real agent with real performance data for a given skill k, e.g., S sales on N calls, that an actual agent in that skill k obtained, do the following:

a. For each hypothetical agent and within each skill, calculate the probability of the evidence, e.g., the likelihood of the observed result, from the real agent's data. That is for hypothetical agent i, given her performance of $F_i$, what is the probability that such a hypothetical agent would get the S sales on N calls that the actual agent did in that given skill. Call this the Probability Of the Evidence (the Likelihood of the Observed Result for that Agent) $POE_{i,k}$, being the Probability of the Evidence in the k'th skill for the i'th hypothetical agent. The method is performed and the system loops through each of the skills, s, e.g., selling washing machines, selling dryers, selling vacuum cleaners, etc.

b. Calculate a total probability $TP_i$ for hypothetical agent i, being the (prior) probability of being that hypothetical agent x the probabilities of the evidences in each skill, that is $TP_i = PA_i \times POE_{i,1} \times POE_{i,2} \times, \ldots, \times POE_{i,s}$ where there are s skills.

c. Repeat 3a & 3b for all hypothetical agents, which span the range of possible performances as set up in step 2 above. One of these will have the greatest value of TP and that hypothetical agent's performance can be looked up in the array generated in step In embodiments, this is the real agent's most probable true global performance.

This method provides a manner in which to combine the available data on each agent to estimate $AP_i$ and in fact, may be the theoretically optimal way of combining all the data available on each agent to estimate AP.

Figure 11:
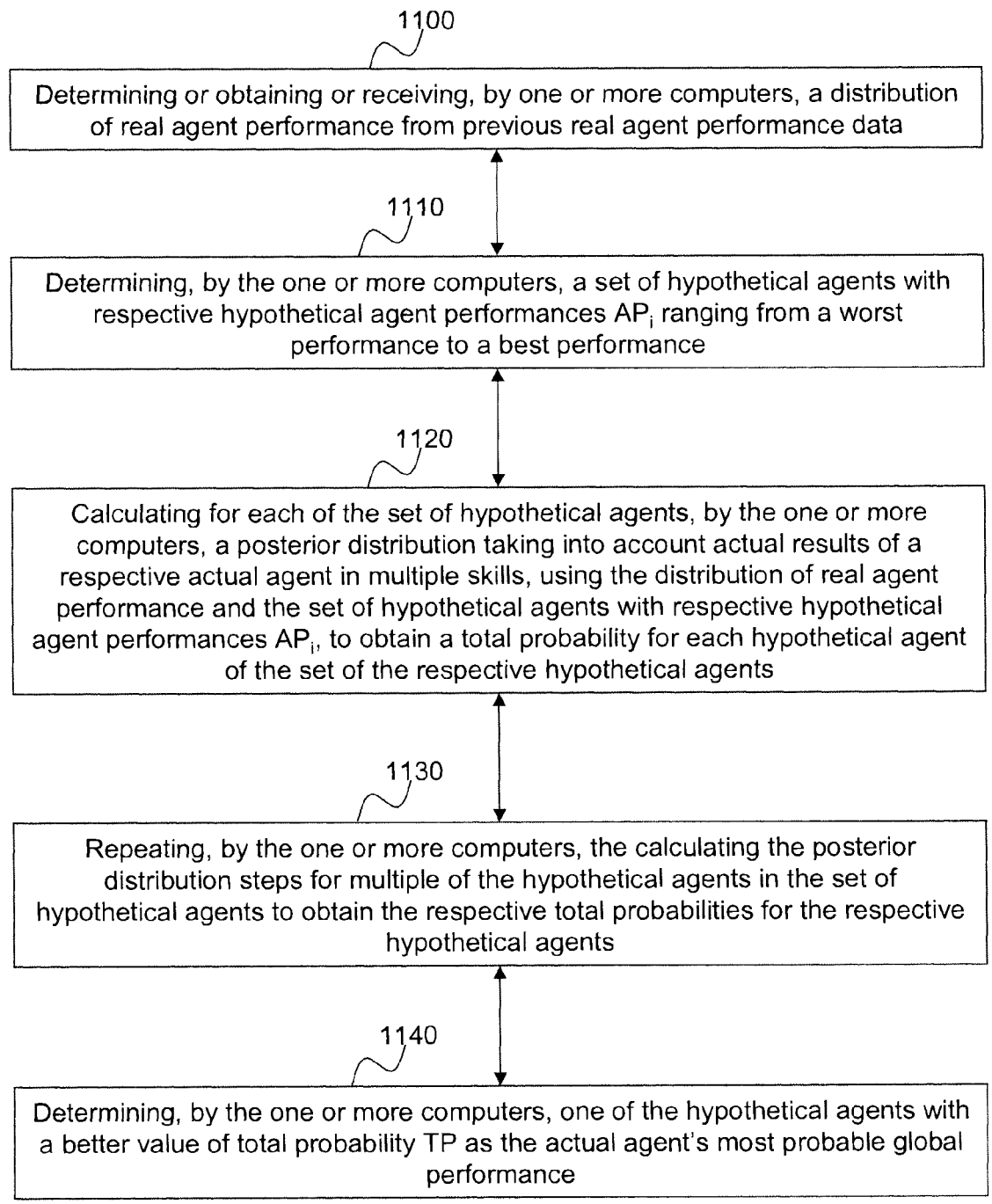
FIG. 11 illustrates an exemplary process for determining an actual agent's global performance based at least in part in posterior distribution calculations.

Referring to FIG. 11, embodiments of a method process are illustrated to calculate an actual agent's most probable global performance. In embodiments, the method comprises an operation represented by block 1100 of determining or obtaining or receiving, by one or more computers, a distribution of real agent performance from previous real agent performance data for a respective skill k in a set of skills. In embodiments, the agent performance is one selected from the group of sale or no sale, revenue per call, revenue generating units (RGU) per call, and handle time. In embodiments, the real agent performance is binomial and distribution of real agent performance is truncated at least at one end thereof.

Block 1110 represents an operation of determining, by the one or more computers, a set of hypothetical agents with respective hypothetical agent performances $AP_i$ ranging from a worst performance to a best performance for the respective skill k. In embodiments, the set of hypothetical agents comprises at least 10 hypothetical agents. In embodiments, the set of hypothetical agents comprises at least 50 hypothetical agents. In embodiments, the set of hypothetical agents comprises at least 100 hypothetical agents.

Block 1120 represents an operation of calculating for each of the set of hypothetical agents, by the one or more computers, a posterior distribution taking into account actual results of a respective actual agent in each of the set of skills, using the distribution of real agent performance and the set of hypothetical agents with respective hypothetical agent performances $AP_i$, to obtain a total probability for each hypothetical agent of the set of the hypothetical agents. In embodiments, the calculating the posterior distribution may comprise calculating for each hypothetical agent, i, in the set of hypothetical agents, by the one or more computers, for a first skill k and the hypothetical agent performance $AP_i$ for the respective hypothetical agent, i, a probability of the evidence $POE_{ik}$ that the respective hypothetical agent i would obtain S sales on N calls, that the respective actual agent in that skill k obtained; and calculating, by the one or more computers, a total probability $TP_i$ for the hypothetical agent i, comprising multiplying $AP_i$ for the hypothetical agent by the $POE_{ik}$ for each skill k for the hypothetical agent i.

Block 1130 represents an operation of repeating, by the one or more computers, the calculating the posterior distribution steps for multiple of the hypothetical agents in the set of hypothetical agents to obtain the respective total probabilities for the respective hypothetical agents.

Block 1140 represents an operation of determining, by the one or more computers, one of the hypothetical agents with a better value of total probability TP as the actual agent's most probable global performance. In embodiments, the most probable global performance determining step comprises selecting one of the hypothetical agents with a best value of total probability TP as the actual agent's most probable global performance.

In embodiments, the method may be used in combination with any other agent-caller matching algorithm. For example, the method may further comprise the steps of using, by the one or more computers, demographic data or psychographic data of the agents and demographic data or psychographic data of the callers in a multi-element pattern matching algorithm in a pair-wise fashion for a desired outcome to obtain a valuation for each of multiple of agent-caller pairs, and combining, by the one or more computers, results of the pattern matching algorithm and the respective most probable global performances of the respective agents to select one of the agent-caller pairs.

Figure 12:
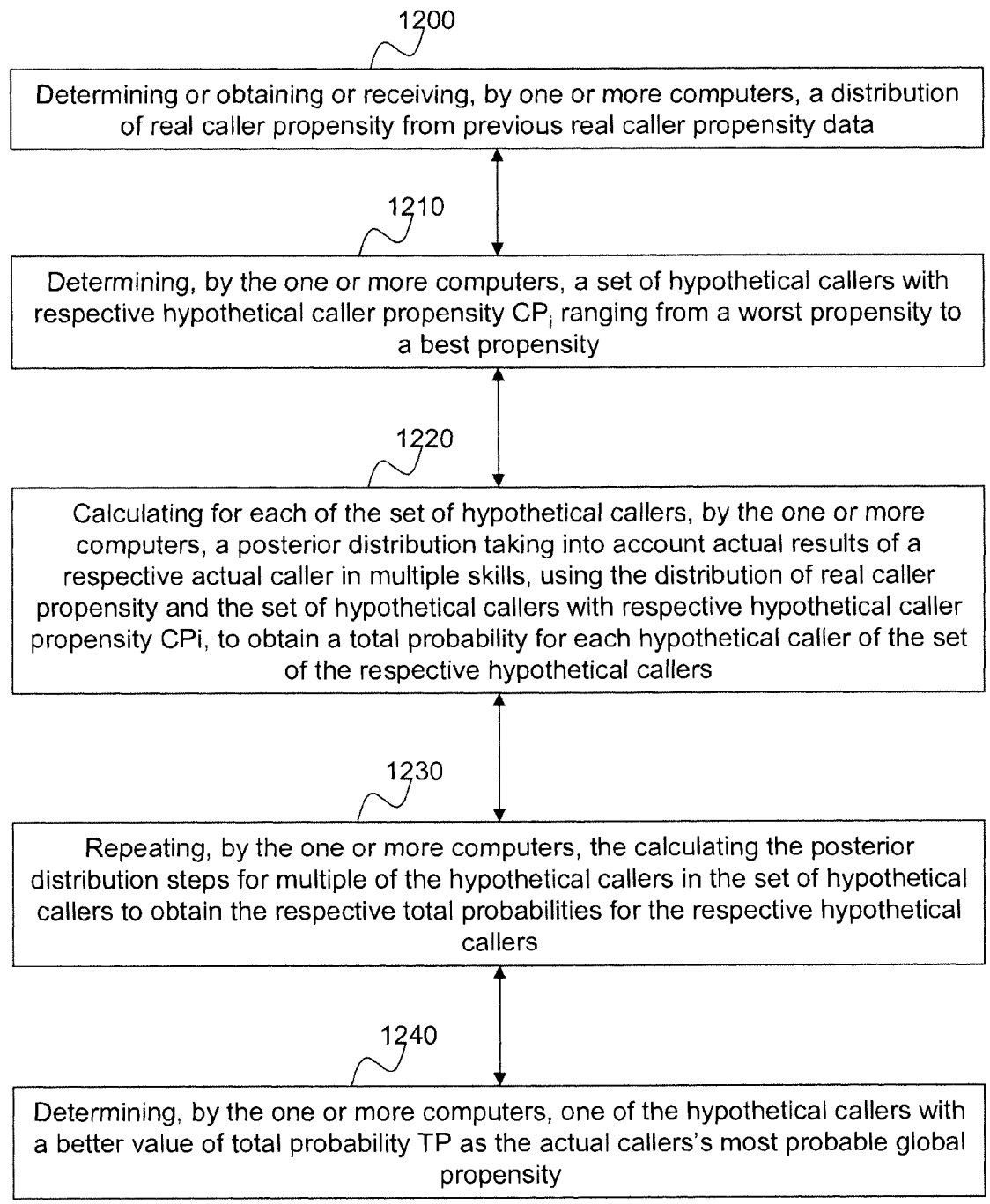
FIG. 12 illustrates an exemplary process for determining a callers agent's global propensity based at least in part in posterior distribution calculations.

Referring to FIG. 12, embodiments of a method process are illustrated to calculate an actual caller's most probable global propensity. In embodiments, the method comprises an operation represented by block 1200 of determining or obtaining or receiving, by one or more computers, a distribution of real caller propensity from previous real caller propensity data for a respective caller partition in a set of caller partitions. In embodiments, the caller propensity is one selected from the group of purchase of product or service A or no purchase, purchase of product or service B or no purchase, purchase of product or service C or no purchase, save a continuing subscription, revenue per purchase, revenue generating units (RGU) per call, handle time and customer satisfaction, to name a few Block 1210 represents an operation of determining, by the one or more computers, a set of hypothetical callers with respective hypothetical caller propensities $CP_i$ ranging from a worst propensity to a best propensity.

Block 1220 represents an operation of calculating for each of the set of hypothetical callers, by the one or more computers, a posterior distribution taking into account actual results of a respective actual caller in multiple of the caller partitions, using the distribution of real caller propensity and the set of hypothetical callers with respective hypothetical caller propensities $CP_i$, to obtain a total probability for each hypothetical caller of the set of the respective hypothetical callers. In embodiments, the partition is based at least in part on one or more selected from the group of demographic data, area code, zip code, NPANXX, VTN, geographic area, 800 number, and transfer number. In embodiments, the calculating the posterior distribution step may comprise calculating for each hypothetical caller, i, in the set of hypothetical callers, by the one or more computers, for a first partition and the hypothetical caller propensity $CP_i$ for the respective hypothetical caller, i, a probability of the evidence $POE_{ik}$ that the respective hypothetical caller i would have S sales, that the respective actual caller in that partition k had; and calculating, by the one or more computers, a total probability $TP_i$ for the hypothetical caller i, comprising multiplying $CP_i$ for the hypothetical caller by the $POE_{ik}$ for each partition k for the hypothetical caller i.

Block 1230 represents an operation of repeating, by the one or more computers, the calculating the posterior distribution steps for multiple of the hypothetical callers in the set of hypothetical callers to obtain the respective total probabilities for the respective hypothetical callers.

Block 1240 represents an operation of determining, by the one or more computers, one of the hypothetical callers with a better or best value of total probability TP as the actual caller's most probable global propensity.

As noted previously, in embodiments, the method may be used in combination with any other agent-caller matching algorithm. For example, embodiments may further comprise the steps using, by the one or more computers, demographic data or psychographic data of the agents and demographic data or psychographic data of the callers in a multi-element pattern matching algorithm in a pair-wise fashion for a desired outcome to obtain a valuation for each of multiple of agent-caller pairs, and combining, by the one or more computers, results of the pattern matching algorithm and the respective most probable global propensities of the respective callers to select one of the agent-caller pairs.

Many of the techniques described here may be implemented in hardware or software, or a combination of the two.

Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 10:
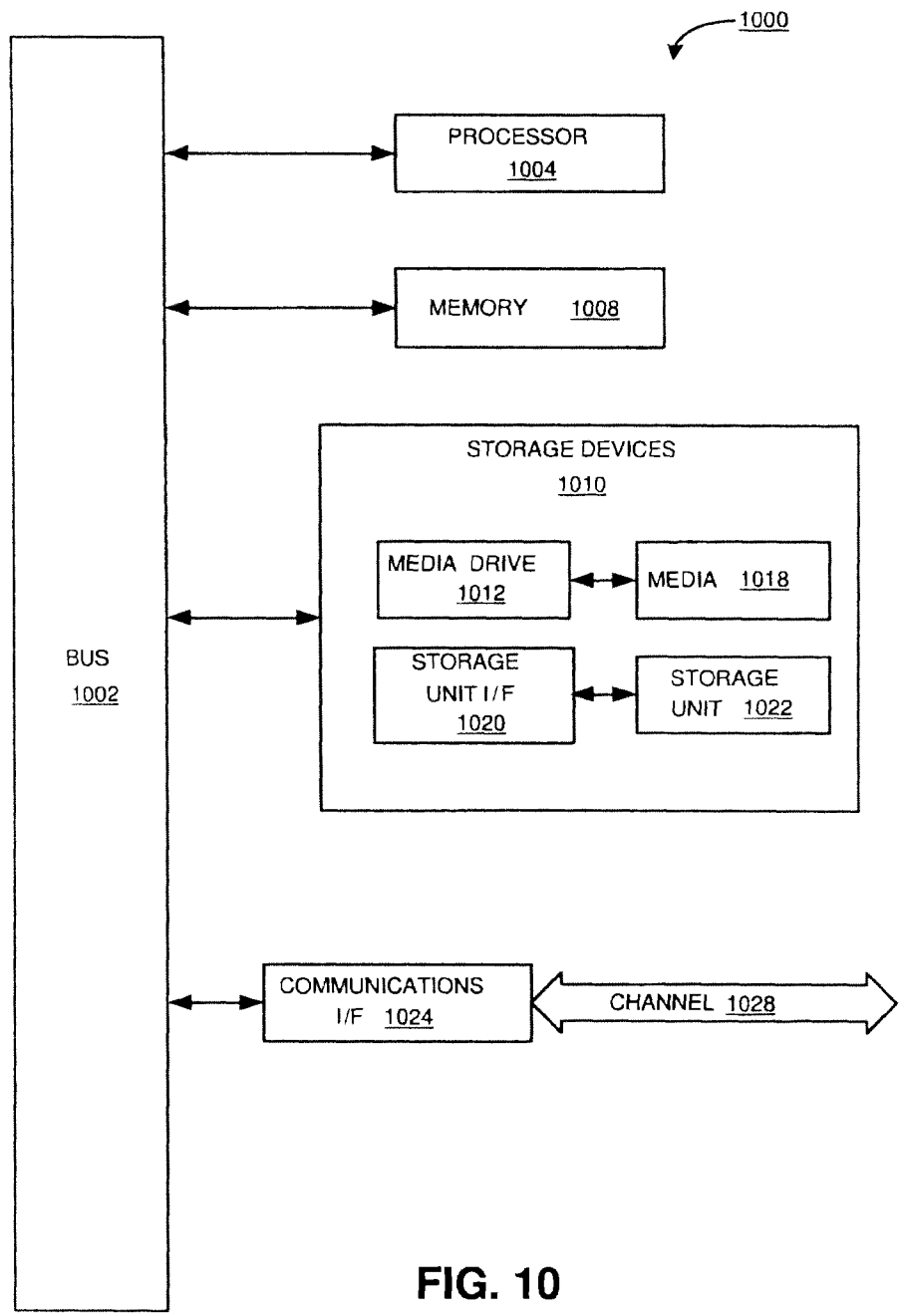
FIG. 10 illustrates a typical computing system that may be employed to implement some or all processing functionality in certain embodiments of the invention.

FIG. 10 illustrates a typical computing system 1000 that may be employed to implement processing functionality in embodiments of the invention. Computing systems of this type may be used in clients and servers, for example. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special purpose processing engine such as, for example, a microprocessor, microcontroller or other control logic. In this example, processor 1004 is connected to a bus 1002 or other communication medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory ("ROM") or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having stored therein particular computer software or data.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a USB port), a PCMCIA slot and card, etc. Software and data transferred via communications interface 1024 are in the form of signals which can be electronic, electromagnetic, optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 1008, storage media 1018, or storage unit 1022. These and other forms of computer-readable media may be involved in storing one or more instructions for use by processor 1004, to cause the processor to perform specified operations. Such instructions, generally referred to as "computer program code" (which may be grouped in the form of computer programs or other groupings), when executed, enable the computing system 1000 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage media 1018, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made 27 without departing from the invention in its broader aspects. The appended claims encompass such changes and modifications within the spirit and scope of the invention.

What is claimed is:

1. A method, comprising:
    determining or obtaining or receiving, by one or more computers, a distribution of real agent performance from previous real agent performance data for a respective skill k in a set of skills;
    determining, by the one or more computers, a set of hypothetical agents with respective hypothetical agent performances $AP_i$ ranging from a worst performance to a best performance for the respective skill k;
    calculating for each of the set of hypothetical agents, by the one or more computers, a posterior distribution taking into account actual results of a respective actual agent in each of the set of skills, using the distribution of real agent performance and the set of hypothetical agents with respective hypothetical agent performances $AP_i$, to obtain a total probability for each hypothetical agent of the set of the hypothetical agents;
    wherein the calculating the posterior distribution comprises:
        calculating for each hypothetical agent, i, in the set of hypothetical agents, by the one or more computers, for a first skill k in the set of skills and the hypothetical agent performance $AP_i$ for the respective hypothetical agent, i, a probability of evidence $POE_{ik}$ that the respective hypothetical agent i would obtain S sales on N calls, that the respective actual agent in that skill k obtained; and
        calculating, by the one or more computers, a total probability $TP_i$ for the hypothetical agent i, comprising multiplying $AP_i$ for the hypothetical agent by the $POE_{ik}$ for each skill k for the hypothetical agent i;
    determining, by the one or more computers, one of the hypothetical agents with a better value of total probability TP as the respective actual agent's most probable global performance;
    and
    connecting, by the one or more computers, the respective actual agent to one of a set of callers based at least in part on the respective actual agent's most probable performance.

2. The method as defined in claim 1, wherein the agent performance is one selected from the group of sale or no sale, revenue per call, revenue generating units (RGU) per call, handle time and customer satisfaction.

3. The method as defined in claim 1, wherein the agent skills k comprise two or more selected from the group of sales of product or service A, sales of product or service B, and providing service advice for a product C.

4. The method as defined in claim 1, wherein the most probable global performance determining step comprises selecting one of the hypothetical agents with a best value of total probability TP as the actual agent's most probable global performance.

5. The method as defined in claim 1, wherein the set of hypothetical agents comprises at least 10 hypothetical agents.

6. The method as defined in claim 1, wherein the set of hypothetical agents comprises at least 50 hypothetical agents.

7. The method as defined in claim 1, wherein the set of hypothetical agents comprises at least 100 hypothetical agents.

8. The method as defined in claim 1, wherein the real agent performance is binomial and distribution of real agent performance is truncated at least at one end thereof.

9. The method of claim 1, further comprising:
    using, by the one or more computers, demographic data or psychographic data of the agents and demographic data or psychographic data of the callers in a multi-element pattern matching algorithm in a pair-wise fashion for a desired outcome to obtain a valuation for each of multiple of agent-caller pairs, and
    combining, by the one or more computers, results of the pattern matching algorithm and the respective most probable global performances of the respective agents to select one of the agent-caller pairs.

10. A method, comprising:
    determining or obtaining or receiving, by one or more computers, a distribution of real caller propensity from previous real caller propensity data for a respective caller partition in a set of caller partitions;
    determining, by the one or more computers, a set of hypothetical callers with respective hypothetical caller propensities $CP_i$ ranging from a worst propensity to a best propensity;
    calculating for each of the set of hypothetical callers, by the one or more computers, a posterior distribution taking into account actual results of a respective actual caller in multiple of the caller partitions, using the distribution of real caller propensity and the set of hypothetical callers with respective hypothetical caller propensities $CP_i$, to obtain a total probability for each hypothetical caller of the set of the respective hypothetical callers;
    wherein the calculating the posterior distribution comprises:
        calculating for each hypothetical caller, i, in the set of hypothetical callers, by the one or more computers, for a first partition in the set of caller partitions and the hypothetical caller propensity $CP_i$ for the respective hypothetical caller, i, a probability of evidence $POE_{ik}$ that the respective hypothetical caller i would have S sales, that the respective actual caller in that partition k had; and
        calculating, by the one or more computers, a total probability $TP_i$ for the hypothetical caller i, comprising multiplying $CP_i$ for the hypothetical caller by the $POE_{ik}$ for each partition k for the hypothetical caller i;
    determining, by the one or more computers, one of the hypothetical callers with a better value of total probability TP as the respective actual callers's most probable global propensity; and
    connecting, by the one or more computers, an agent to the respective actual caller based at least in part on the actual callers's most probable performance.

11. The method as defined in claim 10, wherein the caller propensity is one selected from the group of purchase of product or service A or no purchase, purchase of product or service B or no purchase, purchase of product or service C or no purchase, revenue per purchase, revenue generating units (RGU) per call, and handle time.

12. The method as defined in claim 10, wherein the partition is based at least in part on one or more selected from the group of demographic data, area code, zip code, NPANXX, VTN, geographic area, 800 number, and transfer number.

13. A system, comprising:
    one or more computers configured with program code that, when executed, causes performance of the following steps:

determining or obtaining or receiving, by the one or more computers, a distribution of real agent performance from previous real agent performance data for a respective skill k in a set of skills;

determining, by the one or more computers, a set of hypothetical agents with respective hypothetical agent performances $AP_i$ ranging from a worst performance to a best performance for the respective skill k;

calculating for each of the set of hypothetical agents, by the one or more computers, a posterior distribution taking into account actual results of a respective actual agent in the set of skills, using the distribution of real agent performance and the set of hypothetical agents with respective hypothetical agent performances $AP_i$, to obtain a total probability for each hypothetical agent of the set of the hypothetical agents;

wherein the calculating the posterior distribution step comprises:

calculating for each hypothetical agent, i, in the set of hypothetical agents, by the one or more computers, for a first skill k in the set of skills and the hypothetical agent performance $AP_i$ for the respective hypothetical agent, i, a probability of evidence $POE_{ik}$ that the respective hypothetical agent i would obtain S sales on N calls, that the respective actual agent in that skill k obtained; and calculating, by the one or more computers, a total probability $TP_i$ for the hypothetical agent i, comprising multiplying $AP_i$ for the hypothetical agent by the $POE_{ik}$ for each skill k for the hypothetical agent i;

determining, by the one or more computers, one of the hypothetical agents with a better value of total probability TP as the respective actual agent's most probable global performance; and connecting, by the one or more computers, the respective actual agent to one of a set of callers based at least in part on the respective actual agent's most probable performance.

14. The system as defined in claim 13, wherein the agent performance is one selected from the group of sale or no sale, revenue per call, revenue generating units (RGU) per call, and handle time.

15. The system as defined in claim 13, wherein the agent skills k comprise two or more selected from the group of sales of product or service A, sales of product or service B, and providing service advice for a product C.

16. The system as defined in claim 13, wherein the most probable global performance determining step comprises selecting one of the hypothetical agents with a best value of total probability TP as the actual agent's most probable global performance.

17. The system as defined in claim 13, wherein the set of hypothetical agents comprises at least 10 hypothetical agents.

18. The system as defined in claim 13, wherein the set of hypothetical agents comprises at least 50 hypothetical agents.

19. The system as defined in claim 13, wherein the set of hypothetical agents comprises at least 100 hypothetical agents.

20. The system as defined in claim 13, wherein the real agent performance is binomial and distribution of real agent performance is truncated at least at one end thereof.

21. The system of claim 13, further comprising the one or more computers configured with program code for performing the steps:

using, by the one or more computers, demographic data or psychographic data of the agents and demographic data or psychographic data of the callers in a multi-element pattern matching algorithm in a pair-wise fashion for a desired outcome to obtain a valuation for each of multiple of agent-caller pairs, and combining, by the one or more computers, results of the pattern matching algorithm and the respective most probable global performances of the respective agents to select one of the agent-caller pairs.

22. A system, comprising:

one or more computers configured with program code that, when executed, causes performance of the following steps:

determining or obtaining or receiving, by the one or more computers, a distribution of real caller propensity from previous real caller propensity data for a respective caller partition in a set of caller partitions;

determining, by the one or more computers, a set of hypothetical callers with respective hypothetical caller propensities $CP_i$ ranging from a worst propensity to a best propensity;

calculating for each of the set of hypothetical callers, by the one or more computers, a posterior distribution taking into account actual results of a respective actual caller in multiple of the caller partitions, using the distribution of real caller propensity and the set of hypothetical callers with respective hypothetical caller propensities $CP_i$, to obtain a total probability for each hypothetical caller of the set of the respective hypothetical callers;

wherein the calculating the posterior distribution step comprises:

calculating for each hypothetical caller, i, in the set of hypothetical callers, by the one or more computers, for a first partition in the set of caller partitions and the hypothetical caller propensity $CP_i$ for the respective hypothetical caller i a probability of evidence $POE_{ik}$ that the respective hypothetical caller i would have S sales, that the respective actual caller in that partition k had; and calculating, by the one or more computers, a total probability $TP_i$ for the hypothetical caller i, comprising multiplying $CP_i$ for the hypothetical caller by the $POE_{ik}$ for each partition k for the hypothetical caller i;

determining, by the one or more computers, one of the hypothetical callers with a better value of total probability TP as the respective actual callers's most probable global propensity; and connecting, by the one or more computers, an agent to the respective actual caller based at least in part on the respective actual callers's most probable performance.

23. The system as defined in claim 22, wherein the caller propensity is one selected from the group of product or service A or no purchase, purchase of product or service B or no purchase, purchase of product or service C or no purchase, revenue per purchase, revenue generating units (RGU) per call, and handle time.

24. The system as defined in claim 22, wherein the partition is based at least in part on one or more selected from the group of demographic data, area code, zip code, NPANXX, VTN, geographic area, 800 number, and transfer number.

* * * * *